US010135891B2

(12) United States Patent
Chen et al.

(10) Patent No.: US 10,135,891 B2
(45) Date of Patent: *Nov. 20, 2018

(54) SEAMLESS SWITCHING BETWEEN MULTICAST VIDEO STREAMS

(71) Applicant: SONY CORPORATION, Tokyo (JP)

(72) Inventors: Jian-Rong Chen, Shinfield (GB); Clive Henry Gillard, Alton (GB); Jonathan James Stone, Reading (GB); Michael Ludgate, Alresford (GB)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/905,173

(22) Filed: Feb. 26, 2018

(65) Prior Publication Data

US 2018/0191794 A1 Jul. 5, 2018

Related U.S. Application Data

(63) Continuation of application No. 14/898,918, filed as application No. PCT/GB2014/051871 on Jun. 18, 2014, now Pat. No. 9,942,291.

(30) Foreign Application Priority Data

Jul. 19, 2013 (GB) .................................. 1312969.7

(51) Int. Cl.
*G06F 15/16* (2006.01)
*H04L 29/06* (2006.01)
(Continued)

(52) U.S. Cl.
CPC ........ *H04L 65/4076* (2013.01); *H04L 65/605* (2013.01); *H04L 65/80* (2013.01);
(Continued)

(58) Field of Classification Search
None
See application file for complete search history.

(56) References Cited

U.S. PATENT DOCUMENTS 6,831,917 B1* 12/2004 Cheriton ................. H04L 12/18
370/392
7,742,407 B2* 6/2010 Versteeg ............ H04N 7/17309
370/230

(Continued)

FOREIGN PATENT DOCUMENTS

WO 2004/064277 A2 7/2004
WO 2004/064321 A1 7/2004
WO 2012/175363 A1 12/2012

OTHER PUBLICATIONS

Matthias LAABS, "SDI Over IP—seamless signal switching in SMPTE 2022-6 and a novel multicast routing concept," EBU Technical Review—2012 Q4, XP055131406, Nov. 28, 2012 (7 pages).

(Continued)

*Primary Examiner* — Mohamed Ibrahim
(74) *Attorney, Agent, or Firm* — Oblon, McClelland, Maier & Neustadt, L.L.P.

(57) ABSTRACT

A packet-based video network including: two or more video data sources, each configured to launch video data packets onto the network as multicast data packets each associated with a multicast group identifier corresponding to that video data source; and a video data destination configured to receive and process video data from a video data source by joining a multicast group corresponding to that video data source, and execute a switching operation to switch from receiving video data from a first video data source to receiving video data from a second video data source by leaving a multicast group of the first video data source and joining a multicast group of the second video data source.

(Continued)

The video data destination is configured to process video data corresponding to a video frame which, at end of a frame period, represents a most recently received video frame from the first video data source.

16 Claims, 10 Drawing Sheets

(51) Int. Cl.
| | |
|---|---|
| H04N 21/234 | (2011.01) |
| H04N 21/236 | (2011.01) |
| H04N 21/44 | (2011.01) |
| H04N 21/6405 | (2011.01) |
| H04N 21/643 | (2011.01) |

(52) U.S. Cl.
CPC . *H04N 21/23424* (2013.01); *H04N 21/23602* (2013.01); *H04N 21/44004* (2013.01); *H04N 21/6405* (2013.01); *H04N 21/64322* (2013.01)

(56) References Cited

U.S. PATENT DOCUMENTS

| | | |
|---|---|---|
| 2003/0093803 A1 | 5/2003 | Ishikawa et al. |
| 2005/0081244 A1 | 4/2005 | Barrett |
| 2005/0281328 A1 | 12/2005 | Hurst, Jr. et al. |
| 2006/0015928 A1 | 1/2006 | Setty et al. |
| 2006/0146184 A1 | 7/2006 | Gillard et al. |
| 2006/0200576 A1 | 9/2006 | Pickens et al. |
| 2007/0130597 A1 | 6/2007 | Parker et al. |
| 2007/0192812 A1 | 8/2007 | Pickens |
| 2009/0044242 A1 | 2/2009 | Ramakrishnan et al. |
| 2009/0106807 A1 | 4/2009 | Suzuki et al. |
| 2011/0072484 A1 | 3/2011 | Horen |
| 2012/0198506 A1* | 8/2012 | Joe ............... H04N 21/44209 725/97 |
| 2014/0184909 A1 | 7/2014 | Laabs et al. |

OTHER PUBLICATIONS

Norm Hurst, et al., "MPEG Splicing: A New Standard for Television—SMPTE 312M," SMPTE Journal, vol. 107, No. 11, XP000804761, Nov. 1, 1998, pp. 978-988.

International Search Report dated Jul. 31, 2014 in PCT/GB2014/051871 filed Jun. 18, 2014.

* cited by examiner

AUDIO/VISUAL

AVSCP/CNMCP

SEAMLESS SWITCHING BETWEEN MULTICAST VIDEO STREAMS

CROSS REFERENCE TO RELATED APPLICATIONS

The present application is a continuation of U.S. application Ser. No. 14/898,918 filed Dec. 16, 2015, which is a 371 of International Application No. PCT/G2014/051871 filed Jun. 18, 2014, and claims the benefit of the earlier filing date of GB1312969.7 filed in the United Kingdom Patent Office on Jul. 19, 2013, the entire contents of which are incorporated herein by reference.

BACKGROUND

Field

This disclosure relates to video networks.

Description of Related Art

The background description provided here is for the purpose of generally presenting the context of the disclosure. Work of the presently named inventors, to the extent that it is described in the background section, as well as aspects of the description which may not otherwise qualify as prior art at the time of filing, are neither expressly nor implicitly admitted as prior art against the present disclosure.

Carrying video data over a packetised data network, such as an Ethernet network, involves dividing the video data into data packets, conveying the packets from a source device to a destination device, and reassembling the packets into a version of the original video data.

In a studio environment, or another part of a video production environment, there are constraints which go beyond the simple requirement to rebuild the original data stream at the destination device. These additional constraints relate to (i) the volume of data, (ii) the need to retain time synchronisation at the destination devices between received data from multiple sources, regardless of delays suffered during packet routing, and (iii) the need to send data from multiple sources to multiple destinations.

In terms of the volume of data, a video production environment typically requires frame-specific editing, which means that each individual frame must be capable of being reconstructed from the video data independently of any other video frame. This means that so-called long GOP video data compression techniques, in which some frames are derived from the decoded data for other frames, are not used. Also, in this type of environment, image quality is often considered a priority, which again means that each frame is represented by a relatively high quantity of data compared to other compressed video streams.

Time synchronisation is particularly important in a studio or video production environment, to allow a final video programme to be assembled from multiple video sources. If the signals from the multiple sources are not time-synchronised then some transitions from one source to another (such as slow fades) may be impossible, and in other transitions there can be subjectively disturbing image artefacts at a transition. In a previously proposed arrangement, the need for time synchronisation is dealt with by the combined measures of: time synchronising the source devices; arranging the network links to have a relatively short length (for example, a few hundred metres or at most a few km, rather than anything longer than a few km); and providing a variable delay element at each destination device so as to resynchronise the received data to a common time synchronisation. In a typical example, it has been found that a variable delay equivalent to just a few video lines (for example, 5 video lines) is sufficient to cater for the variations in packet transmission time over this type of network.

Before network-based video transmission was introduced, a typical video studio may have used circuit-switched video distribution, for example under the SDI (serial digital interface) protocol, in which a cross point switch allowed any source of video data to be connected to any destination device (or any selection of multiple destination devices simultaneously). In a previous proposal, such an arrangement can be provided under a packet-switched network by providing packets launched onto the network by the video data sources with so-called multicast group identifiers. A multicast group is an arrangement within a packet based data network such that any destination device can receive data packets carrying a particular multicast group identifier by the destination device "joining" that multicast group. Joining a multicast group involves a simple operation by the destination device and causes the packet router(s) to direct packets having that multicast group identifier to that destination device. So, by arranging for packets from the video data sources to be associated with respective multicast group identifiers, the operation of the circuit switched cross point witch can be mimicked in a packet based system in that any destination device can receive data from any source just by joining that particular multicast group. Similarly, multiple destination devices can receive data from a single source by all joining that multicast group. In practice, a multicasting system may be provided by (a) the data source setting—as a destination address for packets from that data source (relating to that multicast group)—one of a reserved set of IP addresses which are specifically reserved for indicating multicast groups, and (b) a data destination connects to that particular IP address so as to receive data from that IP address. The data destination may use a so-called "IGMP" message (discussed further below) to initiate the receipt of data from the multicast IP address. By this arrangement, the data source does not know (and does not need to know) anything about the data destinations, if any, which are receiving data relating to the multicast group. Similarly, the data destinations do not know (and do not need to know) where the multicast data originates. The multicast group mechanism simply provides a technique for transferring data from one data source to (potentially) multiple data destinations. So, the multicast IP address to which a data source sends data may be considered as a multicast group identifier relating to that source. (For completeness, note that another multicast mechanism also exists, namely "Source Specific Multicast" (SSM) in which the multicast group is identified not only by the multicast IP address but also by the IP address of the source itself. But the same principles apply. In respect of the description which follows, either multicast mode of operation is equally applicable to the present technology).

A feature of this arrangement is that the switching and routing of data packets at the network and transport layers uses standard techniques common to other data networks. Because the data destinations do not know where the multicast data originates from (because all they need to know in order to establish a connection is the multicast IP address), a main overhead in providing this simulated circuit-switched capability is just the need to assign individual multicast group addresses (or identifiers) to each source device (for example, one such address or identifier for each individual stream (video, audio and control) for a source device) and to communicate those identifiers in some manner to the destination devices to allow (or cause) the destination devices to join the appropriate group(s) to allow the destination device to receive the desired data stream(s). In one previously proposed arrangement, this is handled by a controller having a graphical user interface (GUI) which mimics the layout and control of a cross point switch, so that from the user's point of view, the user is simply setting up a route (on a virtual cross point switch) from source A to destination B, and the logic underlying the GUI carries out the appropriate selections of multicast groups and issues appropriate instructions to the destination device B.

SUMMARY

This disclosure provides a packet-based video network comprising:

two or more video data sources, each configured to launch video data packets onto the network as multicast data packets each associated with a multicast group identifier corresponding to that video data source; and a video data destination configured to receive and process video data from a video data source by joining a multicast group corresponding to that video data source, and to execute a switching operation to switch from receiving video data from a first video data source to receiving video data from a second video data source by leaving a multicast group corresponding to the first video data source and joining a multicast group corresponding to the second video data source;

in which:

in respect of a frame period during which the video data destination joins a multicast group corresponding to the second video data source and so receives data representing a partial video frame from the second video data source, the video data destination is configured to process video data corresponding to a video frame which, at the end of that frame period, represents a recently received video frame from the first video data source.

The present disclosure both recognises and addresses the problem of providing so-called clean switching of video data in the type of packet switched video network described above.

Here, clean switching refers to a situation in which a destination device is switching its video input from one source device to another source device, and in particular to the need for the destination device to have a complete video frame for each video frame period.

The problem with achieving clean switching can occur because the switching and routing of video packets in a network of this type is carried out by conventional packet routing devices. Such devices do not have the capability to allow destination devices to join and leave multicast groups at particular, precise, times relative to the data content of the packets. In particular, current packet routing devices simply cannot provide for a destination device to (a) leave a multicast group for a first source device, and (b) join a multicast group for a second source device, at the exact boundary between video frames for each of the two source devices.

But if a destination device leaves one multicast group (for the first source device) and joins another multicast group (for the second source device) at an arbitrary point in time, the situation could arise that—for at least one frame period—the destination device receives a partial frame from the first source device and a partial frame from the second source device, which means that the destination device has no valid video data for that frame period.

The present technology encompasses various techniques to address this problem.

In some embodiments, the video data destination is configured not to leave the multicast group corresponding to the first video data source until the video data destination has received (or is in a position to receive) at least a complete frame of video data from the second video data source.

In other embodiments, the video data destination is configured to reuse a most recently received video frame from the first video data source until the video data destination has received (or is in a position to receive) a complete frame of video data from the second video data source.

Further respective aspects and features of the present disclosure are defined in the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
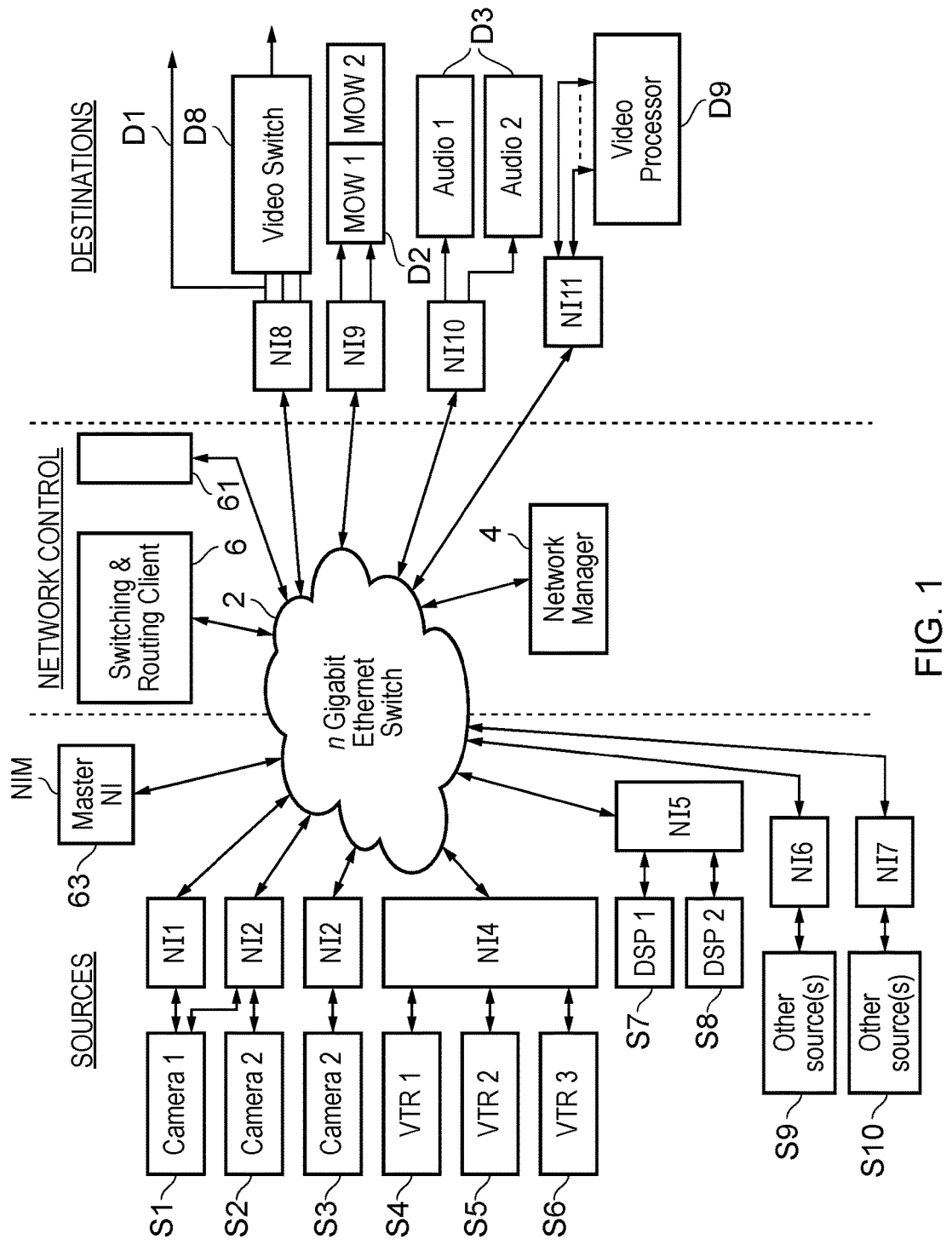
FIG. 1 is a schematic block diagram of a network in a studio.

Referring now to the drawings, wherein like reference numerals designate identical or corresponding parts throughout the several views, in FIG. 1 a network is installed in for example a studio. The network comprises a plurality of source group AV devices consisting of three cameras S1 to S3, three video tape recorders (VTRs) S4 to S6, two digital signal processors (DSPs) S7, S8 and two other source groups S9, S10 which generate serial digital audio data only. The network further comprises a set of destination end point AV devices consisting of a video switch D8, a pair of monitors D2, a pair of audio processors D3 and a video processor D9. An Ethernet switch 2 effects connections between source group devices and destination end point devices.

All of the group devices S1 to S10 and D1, D2, D3, D8, D9 are connected to the network via at least one Enhanced Network Interface Card (ENIC) NI1 to NI11, which differs from a standard network interface card and whose structure and function is described below with reference to FIG. 4. The network further comprises a network control arrangement consisting of a first switching and routing client 6, an additional switching and routing client 61 and a network manager 4. A user may request a change in the current configuration of the virtual circuit-switched connections of the network via a Graphical User Interface (GUI) generated by a computer software application, which in this arrangement is displayed on a monitor associated with the switching and routing client 6. However, in alternative arrangements the GUI is displayed on a monitor associated with the network manager 4.

The network is an Ethernet multicast network comprising the Ethernet switch 2, which is an asynchronous nGigabit Ethernet switch 2, where n is 1 or 10 for example.

Connected to the Ethernet switch 2 are network nodes comprising the source "groups" S1 to S10, the destination end points D1, D2, D3, D8 and D9, and the network control arrangement, which in this example comprises the network manager 4 and the switching and routing clients 6, 61.

A source group is defined to be an AV device such as (for example) a camera S1 or a video tape recorder (VTR) S4 that is operable to generate or supply audio and/or video data for transmission across the network, the source group having one or more input and/or one or more output terminal. Each input/output terminal of the AV device is connected to a port of one of the ENICs NI1 to NI11. However, different terminals of the same AV device may be connected to different ENICs as in the case of source group S1 in FIG. 1, which has a first output terminal connected to ENIC NI1 and a second output terminal connected to ENIC N12. A destination end point is defined to be an AV device such as a video switch D8, video processor D9 or audio processor D3, that is operable to receive packetised audio and/or video data via the network and to perform processing operations on the received data.

Similarly to the source group, the destination end point comprises one or more inputs and/or one or more outputs which can be connected to different ports of the same ENIC or to different ENICs.

It will be appreciated that a destination end point may also act as a source and a source group may also act as a destination for different data exchange events on the network. For example the VTR S4 has audio, video, status and proxy source and/or destination devices associated with it and for a data exchange event involving output of data across the network from a video source device on the VTR S4 to the video processor D9, the VTR S4 acts as a source group. A different data exchange event may involve the VTR S4 receiving data from a camera S1 that has been routed via the network through the video processor D9 for subsequent recording by the VTR S4, in which case, the processed video data will be received from the network at a destination device (ENIC input terminal) associated with the VTR S4 for subsequent supply to the VTR 54 in serial digital form for recording so that the VTR S4 acts as a destination end point in this context.

Whilst the AV devices themselves are denoted as source groups S1 to S10 and destination end points D1, D2, D3, D8, D9, each of these groups is connected to one or more ENIC ports. The ENIC ports will be denoted "source devices" and "destination devices". A "source device" is defined to be an ENIC output port, which outputs packetised data onto the network whereas a "destination device" is defined to be an ENIC input port, which receives packetised data from the network. The source devices and destination devices of an ENIC can be associated with the source groups (AV devices) from which they receive data for transmission across the network or the destination end points to which they deliver data from the network. The network manager 4 keeps track of the mappings between ENIC ports and AV devices.

The network manager 4 stores a freely assignable alphanumeric label denoted "tally text" for each source group S1 to S10 of the network. Tally text provides, as a convenience for the user, a locally recognisable name for the respective device (this does not represent a multicast group identifier or the like, but is just a free-form user notation or label). An example of tally text is a name such as "VTR1" which may be given to a source group S4 or a cameraman's name (for example, "Jim") which may be given to the source group camera S1. The tally text is recorded at the network manager. All groups connected to the network may be named in this way. Source devices and destination devices of the ENIC may be labelled with tally text derived from the associated source group or destination end point AV device.

To enable connection to the network, each source group and each destination end point is coupled to the Ethernet switch 2 by at least one network interface card NI1 . . . 11. These network interface cards are specially adapted for transmission of audio and/or video data across the network according to the present technique and are denoted ENICs (Enhanced Network Interface Cards). Each ENIC NI1 to NI8 has a plurality of ports. Input ports of a first subset of the ENICs, NI1 to NI7 receive data directly from source groups such as cameras SI1 to SI3, VTRs S4 to S6 and DSPs SI7, SI8 and the output ports of those ENICs transmit packetised data across the network, whereas input ports of a second subset of the ENICs, NI8 to NI11, receive packetised data derived from other source groups across the network whilst their output ports supply serial digital audio and/or video data to destination end points such as the video switch D8 and audio processors D3. The network optionally also comprises a master ENIC NIM 63 (See FIG. 1) which handles aspects of network management.

In a conventional studio, the source groups (for example cameras) and destination end points (for example video processors) are connected by a cross point switch. The conventional cross point switch requires specific known devices to be connected to corresponding specific known ports on the switch to ensure that they can be connected together via the switch. By way of contrast, the network of FIG. 1, including the Ethernet switch 2, is configured by the network manager 4 and by the switching and routing client 6 to provide virtual circuit-switched connections that emulate a cross point switch at least to the extent that any one or more source groups can be connected to any one or more destination end points. The virtual circuit-switched connections are facilitated by implementation, in the arrangement of FIG. 1, of an Internet Protocol (IP) multicast network that uses a known protocol, IGMP (Internet Group Management Protocol).

The multicast network enables transmission of data from one source device to several destination devices belonging to a predetermined multicast group across the network and IGMP provides a means of identifying which multicast group a source device or destination device belongs to. Each source device is assigned an identifier (a multicast group IP address as discussed above) so that source device identifiers are associated with a given multicast address. To form a data connection, a destination device issues an IGMP message to "join" a multicast group, which has the effect of causing that destination device to receive data from that IP address. Unlike the conventional cross point switch network, in the network of FIG. 1 the actual physical ports of the Ethernet switch 2 to which the source devices and destination devices are connected are irrelevant because the connections are flexibly specified using the identifiers (multicast addresses) and associated communication protocols.

Accordingly, this arrangement provides an example of a packet-based video network comprising two or more video data sources, each having circuitry configured to launch video data packets onto the network as multicast data packets each associated with a multicast group identifier corresponding to that video data source. The arrangement also provides an example of a video data destination having circuitry configured to receive and process video data from a video data source by joining a multicast group corresponding to that video data source, and to execute a switching operation to switch from receiving video data from a first video data source to receiving video data from a second video data source by leaving a multicast group corresponding to the first video data source and joining a multicast group corresponding to the second video data source.

It should be noted that in the example arrangement of FIG. 1 the network operates as follows: a single source device should belong to only one multicast group that is not shared by any other sources. Although a multicast group may in fact exist with no associated destinations, in order to illustrate an operational network at least one destination device receives data from that source device by joining the source device's multicast group. A given destination device joins a multicast group in order to receive data from the associated source device by issuing an IGMP multicast group join message.

The network control arrangement 4, 6, 61 initiates each virtual circuit-switched connection by sending a control message to the destination device (that is, to an input terminal of one of the destination end point AV devices or a corresponding ENIC terminal) instructing the device to issue such a message or request to the Ethernet switch 2 to join the multicast group of the appropriate source device. Multiple destination devices can join a given multicast group and the Ethernet switch 2 or another part of the packet routing arrangement (not shown) performs the required duplication of the data from the source device transmitting to that multicast group. The data that may be transmitted by a source device to the plurality of destination devices of the multicast group includes video data, audio data, timecode data or status data.

The functionality of the ENIC is described in more detail below with reference to FIG. 4. An ENIC allows any source group, for example a camera, and any destination end point, for example a VTR, which is not designed for use with a multicast network to be used in a multicast network. An ENIC is a "dumb" device which can be requested to supply and receive audio, video, and control data streams. An ENIC cannot view or initiate any change to the configuration of the network. Rather, the network manager 4 controls to which multicast group(s) a given ENIC may subscribe and directs the ENIC to issue requests to the Ethernet switch 2 to join those multicast groups. Although, in the arrangement of FIG. 1, the ENICs NI1 to NI11 are distinct entities from the source group and destination end point AV devices with which they are associated, it will be appreciated that in alternative arrangements the functionality of an ENIC could be integrated into an AV device. Each ENIC has an associated Ethernet address and an IP address. The Ethernet address is a 48-bit value that specifies a physical address within the LAN whereas the IP address is (in for example IPv4) a 32-bit value that identifies each sender or receiver of packet-based information across the Internet. The Ethernet address typically differs from the IP address but the two addresses can be mapped to each other, for example using Address Resolution Protocol (ARP). The IP address is required to enable the Ethernet switch 2 to route data to and from the ENIC. Each data stream associated with the ENIC is identified using both a multicast address and a User Datagram Protocol (UDP) port number. UDP is a transport layer protocol that together with IP mediates data communication across the network. UDP provides port numbers to distinguish different transaction requests (this service is not provided by IP). In this embodiment a single IP address is associated with each ENIC. However, in alternative embodiments multiple IP addresses could be associated with a single ENIC. Besides the Ethernet address and IP address, the ENIC also has an associated ENIC identifier (ID) and a plurality of port IDs for respective ones of the destination devices and source devices associated with the ENIC. All of the addresses and IDs associated with each ENIC are recorded by the network manager 4. The source devices and destination devices (individual inputs and outputs of the network node devices S1-S8 and D1, D2, D3, D8, D9) correspond to respective ones of one or more physical inputs and outputs of an ENIC. An ENIC acts as a switch, which switches data received from the Ethernet switch 2 to a specified physical output of the ENIC and switches data from a specified physical input to the switch 2.

The network, implemented using the Ethernet switch 2, is asynchronous. However video and audio data need synchronous processing. The ENICs provide synchronous operation across the network and align frames of different video streams for purposes such as editing. The video and audio devices (source groups and destination end points) connected to the network operate on serial digital data, for example using the digital standard Serial Digital Interface (SDI) for interface of component digital video or the Audio Engineering Society (AES) digital audio standard for audio data. The ENICs convert data from the source device at the transmission end from SDI or AES serial digital format to a packetised format suitable for transmission across the network, in particular to multicast UDP/IP data packets. At the receiving end, the ENICs convert multicast UDP/IP data packets received from the network to a serial digital data format suitable for delivery to the destination device, which the ENICs can delay so as to synchronise the serial data to a required synchronisation clock.

A further functionality provided by the ENICs is to generate from a full resolution video stream a reduced resolution video stream denoted "proxy video". The proxy video is a reduced-bandwidth version of the corresponding full-resolution video information and, as such, is suitable for processing by network clients having restricted storage capacity and/or processing power or for use in previewing information content for downloading across the network.

The network manager 4 co-operates with the switching and routing clients 6, 61 to form the network control arrangement that is operable to assign multicast group identifiers to the audio and video source devices and to instruct destination devices to issue requests to the Ethernet switch 2 to join a particular multicast group in order to receive data from the corresponding source device. The network manager 4 maintains information of the current state of the network and all instructions that initiate a change to the device configuration or to the network connectivity originate from the network manager 4. In the example arrangement of FIG. 1, the network manager is a Personal Computer (PC) that is linked to the network via a standard network interface card. In alternative arrangements the network manager could be for example a workstation and the network control arrangement may comprise more than one network manager.

The network manager 4 maintains a database specifying the configuration of the network. In the arrangement of FIG. 1, the database is stored on the same PC as the network manager 4 but in alternative arrangements it could be stored on at least one different PC. The database records, for each ENIC, the associated Ethernet address, the IP address, the ENIC ID and the source devices and destination devices (inputs and outputs of the network node devices) currently connected to the network via that ENIC. The network manager 4 also performs the functions of: allocating network resources to the switching and routing client (s) 6,61 and to the ENICs NI1 to NI11; sending commands to the destination devices to issue requests to the Ethernet switch 2 to join a specified multicast group thereby changing the audio and/or video virtual circuit-switched connections across the network; and ensuring that each switching and routing client's 6, 61 view of the network is correct.

The network manager stores and maintains a set of data relating to each of a number of different categories of device on the network. Since control messages are sent from the network control manager 4 to the ENICs NI1 to NI11 (rather than to input/outputs), each ENIC port is categorised as belonging to one of a plurality of device types/categories. The "source device" and "destination device" have already been discussed above.

In particular, the network configuration data is of four basic types relating to four different types of device (ENIC input/output ports) and a fifth data type associated with a group of devices that are commonly controlled. The four basic device types are:

1. SOURCE device: video, audio and status data from a source device is appropriately formatted by an ENIC and transmitted to a multicast group on the network. Each SOURCE device can also transmit a low-bandwidth video proxy.

2. DESTINATION device: video, audio and status data from the network is received by a destination device by joining a multicast group.

3. CONTROL SOURCE device: control commands are generated by an ENIC or by a network client and are transmitted unicast to a predetermined CONTROL DESTINATION.

4. CONTROL DESTINATION device: this receives control commands unicast from a CONTROL SOURCE.

The switching and routing client 6 cannot directly access the SOURCE and CONTROL DESTINATION devices. These devices are members of a CONTROL SOURCE GROUP, which is a group of devices that cannot be controlled independently. For example, a standard SDI video output and a super SDI output from a VTR are both connected to an ENIC for transmission onto the network 2. The SDI input may be represented as four SOURCE devices comprising two video source devices, V0, V1 (one from the SDI output and one from the super SDI output) and two audio source devices A0, A1 in the network configuration.

These four source devices are generated by the same physical device (the source group is the VTR). The four source devices have a common time code and stream status, (for example, stop, FF (fast forward), rew (rewind), and so on). Hence these four source devices are jointly controlled via a control source group rather than being independently controlled.

A predetermined set of information (a data structure) is stored by the network manager 4 in relation to each of the above device types i(source, destination, control source control destination and control source group) in addition to an ENIC data structure.

In addition, the following data is stored by the network manager 4 for each of the ENICs NI1 to NI 11 as the ENIC data structure: a 16-bit ID that uniquely identifies the ENIC; a 48-bit media access control (MAC) address associated with the ENIC; a 32-bit ENIC IP address; a 32-bit IP address for the master clock of the ENIC and a 32-bit filed specifying a number of parameters used for device to hardware mappings.

The ENIC data structure also maps the four source devices of the above example to the physical ports on the ENIC card and includes any hardware limitations that restrict the ideal model described above. When an ENIC initialises it will receive information on what devices are connected to its UDP (RS422) ports, so that the correct driver can be used.

Thus, for each destination end point, the network manager 4 stores each multicast IP address from which that destination end point derives data. It should be understood that different input/output ports of a given destination end point may receive data from different IP multicast addresses. The data received depends on the ENIC port (source/destination device) to which the input/output ports of the destination end point (AV device) are connected. As specified above in relation to the DESTINATION data structure, for each destination end point an ID for both the destination end point itself and for the source group from which the received data is derived is also stored in the network configuration database.

The source group/destination end point ID comprises an identifier of the ENIC by which the source group /destination end point is connected to the network and an identifier of the ENIC port to which the associated source group/destination end point is connected. A similar set of information is stored in respect of each source group.

In the arrangement of FIG. 1, the switching and routing client 6, similarly to the network manager 4, is a PC linked to the network via a standard network interface card. The switching and routing client 6 is operable to view and/or initiate changes to the network configuration, for example to initiate of change virtual circuit switched connections between source devices and destination devices. Such changes may be initiated by a user interacting with a GUI as described in (for example) WO 2004/064321 A1. In the example arrangement of FIG. 1, the switching and routing client 6 is operable to control both the video switch D8 and the associated ENIC NI8 as well as the supply of video data to the ENIC NI8 to and from the network. The switching and routing client 6 can also control the supply of video or audio data to other destination devices D2, D3 and D9 via the associated ENICS NI9, NI10 and NI11 respectively. The further switching and routing client 61 is operable to control a different subset of destination devices and their ENICS from those controlled by the switching and routing client 6.

As described above, the network manager 4 maintains a database specifying the current network configuration and co-operates with the switching and routing client 6 to configure the network. Although the network manager 4 can grant the switching and routing client 6 permission to send certain commands directly to the ENIC rather than sending them to the ENIC via the network manager 4, in general, all requests that may affect or potentially jeopardise the network configuration are sent via the network manager so that any changes are coordinated by a single entity. Examples of particular commands that do not jeopardise the network connections and hence can be sent directly from the switching and routing client 6 to an ENIC are data stream control commands such as play, rewind, fast-forward. Apart from storing information specifying the network configuration, the network controller 4 allocates resources to the ENICs and to the switching and routing clients 6, 61, controls all commands that may jeopardise the audio and/or video data connections on the network and ensures that the switching and routing clients 6, 61 have an accurate view of the relevant network connections.

The Ethernet network of the arrangement of FIG. 1 implements various conventional protocols including UDP (user datagram protocol) /IP, TCP (transmission control protocol) /IP, and IGMP (Internet Group Management Protocol). Other protocols implemented in the network include a known real-time protocol (RTP), and two protocols that are proprietary to Sony Corporation: firstly AVSCP (Audio Video Switching Control Protocol), which is used for connection control between the network manager 4 and the ENICS NI1 to NI11 and secondly CNMCP (Client Network Manager Communication Protocol), which is used for communication between the network manager 4 and the switching and routing clients 6, 61. These protocols will be described in more detail below with reference to FIG. 2.

Figure 2:
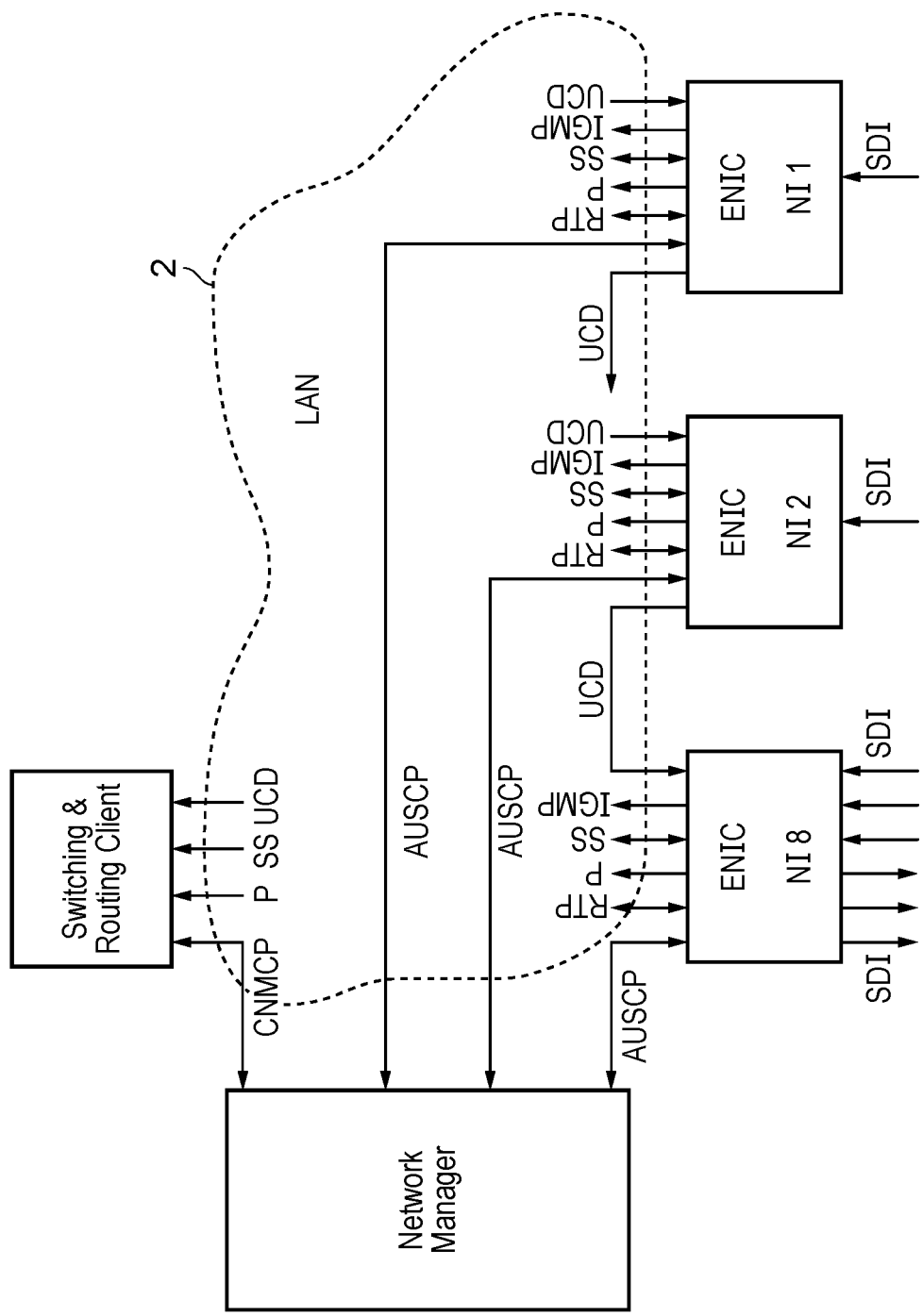
FIG. 2 is a schematic simplified diagram of the network showing data flows across the network.

Referring to FIG. 2, a simplified diagram of the network of FIG. 1 shows only the Network manager 4, the switching and routing client 6, and a subset of the ENICs, in particular NI1 (associated with the camera 1 source group), NI2 (associated with both camera 1 and camera 2 source groups) and NI8 (associated with the video switch D8 destination end point) by way of example. FIG. 2 illustrates how the network manager 4, switching and routing client 6 and the ENICs NI1, NI2, NI8 communicate via the LAN using a number of different communication protocols. As shown in FIG. 2, the network manager 4 communicates with ENICS NI1, NI2, NI8 using AVSCP whereas the switching and routing client 6 communicates with the network manager 4 using CNMCP. The switching and routing client 6 is operable to receive as input Stream Status (SS) data specifying the status of a CONTROL SOURCE GROUP, to receive AV proxy data P and to output Unicast Control Data (UCD) to the network to control a source or destination device. Note that in this arrangement only the switching and routing client receives proxy video P as input although all three ENICs NI1, NI2, NI8 output proxy video to the network. The ENICs NI1, NI2 and NI8, are each operable to output proxy data P, to receive and transmit SS status data across the LAN, to send and receive RTP communications, to output IGMP data specifying to which multicast group that source device may transmitting data, to receive UCD messages across the network from the switching and routing client 6 and/or network manager 4. Note that the ENIC NI2 is operable to send UCD messages directly to another ENIC NI8 bypassing the network manager 4. As described above, this direct communication between ENICs is only permissible for control commands that do not jeopardise the network connections. Since the ENIC NI8 is associated with the destination end point video switch D8 it is operable both to transmit and receive SDI video streams whereas ENICs NI1 and NI2 associated with the cameras are operable only to receive SDI video from outputs on those cameras for packetisation by the ENIC and transmission across the network.

AVSCP uses UDP (User Datagram Protocol) to carry its messages. UDP is a connectionless transport protocol, which means that a one-way data packet is sent by the sending device without notifying the receiving device that the data is en route. On receipt of each data packet, the receiving device does not return status information to the sending device. The data format is described with reference to FIG. 3B below.

AVSCP is used for communication between the network manager and each ENIC for the purpose of connection control and in order to monitor the operation status of ENIC and AV (audio and video) ports. For example, if it is desired to connect a video tape recorder (VTR) destination device to a camera source device to receive AV data then the switching and routing client 6 must send an instruction to the ENIC associated with the destination device, in this case the VTR, to join the port of that ENIC that is connected to the VTR to the specific multicast group that is sourced from the camera. This instruction between the ENIC and the switching control server 6 is sent via the AVSCP protocol.

The AVSCP protocol messages have five main functions, which are to: 1) Monitor the operational status of the ENICs; 2) Discover the configuration of an ENIC; 3) Stop and start audio and video source transmission; 4) Direct ENICs and their associated audio and video devices to join multicast groups; and 5) Set up and delete paths for conveying control data across the network.

The network manager 4 should be aware of the operational status of an ENIC before it can send any instructions to it. Accordingly the AVSCP protocol requires an ENIC to send status messages to the network manager 4 periodically. The network manager 4 can only control AV stream transmission and reception of an ENIC when it is operational. As an alternative to deriving network configuration information from messages periodically generated by the ENICs, the network manager 4 can actively obtain the current configuration of an ENIC by sending a configuration request message to it. The ENIC responds to this request by returning a message specifying the current configuration.

Examples of AVSCP messages are as follows:

STOPTX and STARTTX: these are command messages that allow the network manager 4 to instruct an ENIC to stop transmission and start transmission of a specific AV data stream (specified by AV input port of ENIC);

SWITCHAV and SWITCH AUDIO: these are command messages that enable the network manager 4 to instruct an ENIC to add or delete an AV data stream or audio data stream respectively to a specific multicast group;

SETCTRLTX and SETCTRLRX: these are command messages to set up transmit (TX) and receive (RX) ends of an AV data stream control path. If an application sends a SETCTRLTX message to one ENIC then it will typically also send a SETCTRLRX message to the ENIC at the other end of the control path to create a complete AV control path;

UPDATE TALLY: this is a command message used to request a source/destination device associated with an ENIC port to update its display of tally text information. This command is usually used when an AV source changes its display information.

ACK: this message is sent by an ENIC to the network manager 4 when it has received a command message from the network manager 4. The acknowledged command message is identified by a session ID value and the acknowledgement itself could be either positive or negative. The ACK message of AVSCP is required because UDP is not a guaranteed delivery protocol. If messages are not acknowledged within a predetermined time then they may be retransmitted up to a maximum number of times by the network manager.

For sending streams of audio and video data from the source devices to the destination devices, the transport layer is UDP multicast. The audio and video data are carried in RealTime Protocol (RTP) format within a UDP packet. This applies to the audio data, the full resolution video and the low resolution proxy video. (See FIG. 3A, described below for a description of the data format). RTP provides functions to support real-time traffic, that is, traffic that requires time-sensitive reproduction at the destination application.

The services provided by RTP include payload type identification (such as video traffic), sequence numbering, time-stamping and delivery monitoring. RTP supports data transfer to multiple destinations via multicast distribution if provided by the underlying network. The RTP sequence numbers allow the receiver to reconstruct the original packet sequence. The sequence numbers may also be used to determine the proper location of a packet. RTP does not provide any mechanism to ensure timely delivery, nor does it provide other Quality of Service guarantees.

When an ENIC receives an AVSCP switch request from the network manager 4, the ENIC sends an IGMP join message to the Ethernet switch 2 to join the multicast group of the data it needs to receive.

Control data may be sent, only as a Unicast transmission, directly from one ENIC to another. In the case of control data that is likely to jeopardise virtual circuit-switched connections on the network the control data must be sent via the switching and routing client 6 and/or the network manager 4 to control a device. However, for a specific subset of control data a controller connected to one ENIC may directly control a device connected to another ENIC bypassing the network manager 4 and the switching and routing client 6. For example, commands such as play, pause stop, record, jog etc. may be sent from a controller across the network directly to a source/destination end point such as a VTR. The control channels are set up using AVSCP. The control data itself is carried in UDP messages in this embodiment.

However, TCP may alternatively be used to carry control data.

Figure 3A:
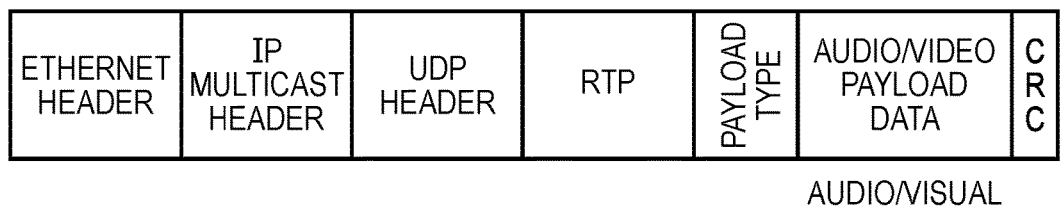
FIG. 3A is a schematic diagram of the format of an audio or video packet used in the network.

Referring to FIG. 3A, the audio and video data format comprises, in order, an Ethernet header, an IP multicast header, a UDP header, an RTP header, a field specifying the type of payload, the payload, and a CRC (cyclic redundancy check) field. The Ethernet header comprises a source Ethernet address and a destination multicast Ethernet address. The IP multicast header comprises the source ENIC IP address and the destination device multicast IP address. There are several different IP address classes: for example Class A has the first 8-bits allocated to the network ID and the remaining 24-bits to the host ID whereas Class B has the first 16 bits allocated to the network ID and the remaining 16-bits to the host ID.

Class D IP addresses are used for multicasting. The four left-most bits of a Class D network address always start with the binary pattern 1110, corresponding to decimal numbers 224 to 239, and the remaining 28 bits are allocated to a multicast group ID. IGMP is used in conjunction with multicasting and Class D IP addresses.

The set of hosts (source and/or destination devices) listening to (receiving data from) a particular IP multicast address is called a host group. A host group may span multiple networks and membership of a host group is dynamic. The Class D IP address is mapped to the Ethernet address such that the low-order 23 bits (of 28) of the multicast group ID are copied to the low-order 23 bits of the Ethernet address. Accordingly 5 bits of the multicast group ID are not used to form the Ethernet address. As a consequence the mapping between the IP multicast address and the Ethernet address is non-unique, which is to say that 32 different multicast group IDs map to the same Ethernet address.

The UDP header comprises source and destination port numbers, which are typically associated with a particular application on a destination device. Note that UDP is redundant in the case of multicast messages since in this case the multicast group address identifies the stream/content. The audio/video streams are transported using RTP protocol. Forward Error Correction (FEC) may be used for certain data streams, for example full resolution video streams to provide a level of protection against data corruption due to network errors. FEC is provided using a known RTP payload format that provides for FEC. FEC is a parity-based error protection scheme.

A known extension to the RTP protocol allows a video scan line number to be specified in the RTP payload header. The RTP header also comprises a field to specify whether 8-bit or 10-bit video is present. Although known RTP and RTP/FEC protocol formats provide the data packet fields necessary to transport audio and video data over an IP network it may also be desired to transmit additional information such as source status and source timecode information. For example if the source device is a VTR then the timecode as stored on the tape should be transferred across the network. The source status information might indicate, for example, whether the VTR is currently playing, stopped or in jog/shuttle mode. This status information allows a user to operate the VTR from a remote network location. Since the timecode data and source status information is required only once per field, the information is transported in an RTP packet marked as vertical blanking. To allow audio and video resynchronisation, the RTP timecode is based on a 27 MHz clock. The payload type field contains data indicating the type of payload (video or audio data). The payload field contains the video or audio data to be transmitted. The CRC is a cyclic redundancy check known in the art.

Figure 3B:
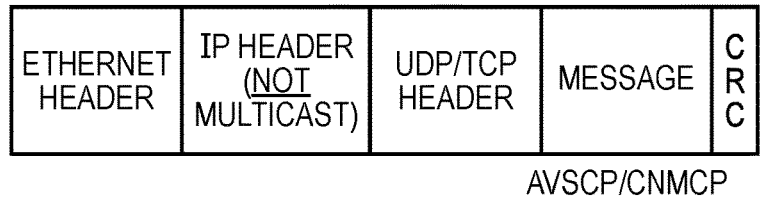
FIG. 3B is a schematic diagram of the format of an AVSCP or CNMCP packet used in the network.

AVSCP and CNMCP messages are carried by a data format as shown in FIG. 3B.

The format comprises in order, an Ethernet header, an IP header (which is not a multicast header), a UDP or TCP header, the payload, and a CRC field. The Ethernet header comprises source and destination Ethernet addresses. The IP header comprises the source ENIC IP address and the destination ENIC IP address. UDP is used for AVSCP and TCP is used for CNMCP. The payload field contains the AVSCP or CNMCP message data. The CRC is a cyclic redundancy check known in the art.

The stream status (SS) format is identical to the audio and video data format as shown in FIG. 3A, with the exception of the content of the payload section: The frame comprises an Ethernet header, an IP multicast header, a UDP header, an RTP header, a payload type identifier, a stream status data payload and a CRC field.

Figure 3C:
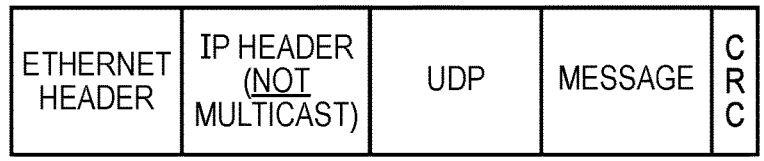
FIG. 3C schematically illustrates a unicast data packet.

The unicast control data format is shown in FIG. 3C and comprises an Ethernet header, a standard IP header (not multicast), a UDP header, a payload section assigned to unicast control data and a CRC field.

IGMP is a known protocol. Multicasting that extends beyond a single network is complicated by the fact that Internet routers must establish whether any hosts (in this case source devices and destination devices) on a given physical network belong to a given multicast group. IGMP is typically used to establish this information. IGMP lets all nodes of a physical network know the current association of hosts to multicast groups. IGMP messages are transmitted in IP datagrams and have a fixed 8-byte IGMP message size concatenated with a 20 byte IP header. The IGMP message includes a 32-bit Class D IP address.

A number of IGMP queries and reports are used by multicast routers (such as the Ethernet switch 2 of FIG. 1) to record which network interfaces have at least one host (source/destination device or group) associated with a multicast group. When the Ethernet switch 2 receives a multicast message from a source device to forward, it forwards the message only to interfaces that currently have destination devices associated with that multicast group.

A destination end point joins a multicast group by sending an IGMP join message to the asynchronous Ethernet switch 2. Note that a single ENIC may include multiple such end points. An ENIC may send and/or receive data in the audio/video format shown in FIG. 3A, in the AVSCP/CNMCP format shown in FIG. 3B or in the UCD data format shown in FIG. 3C. Note that an ENIC does not send or receive CNMCP data (which only passes between the network manager 4 and the switching and routing client 6).

Figure 4:
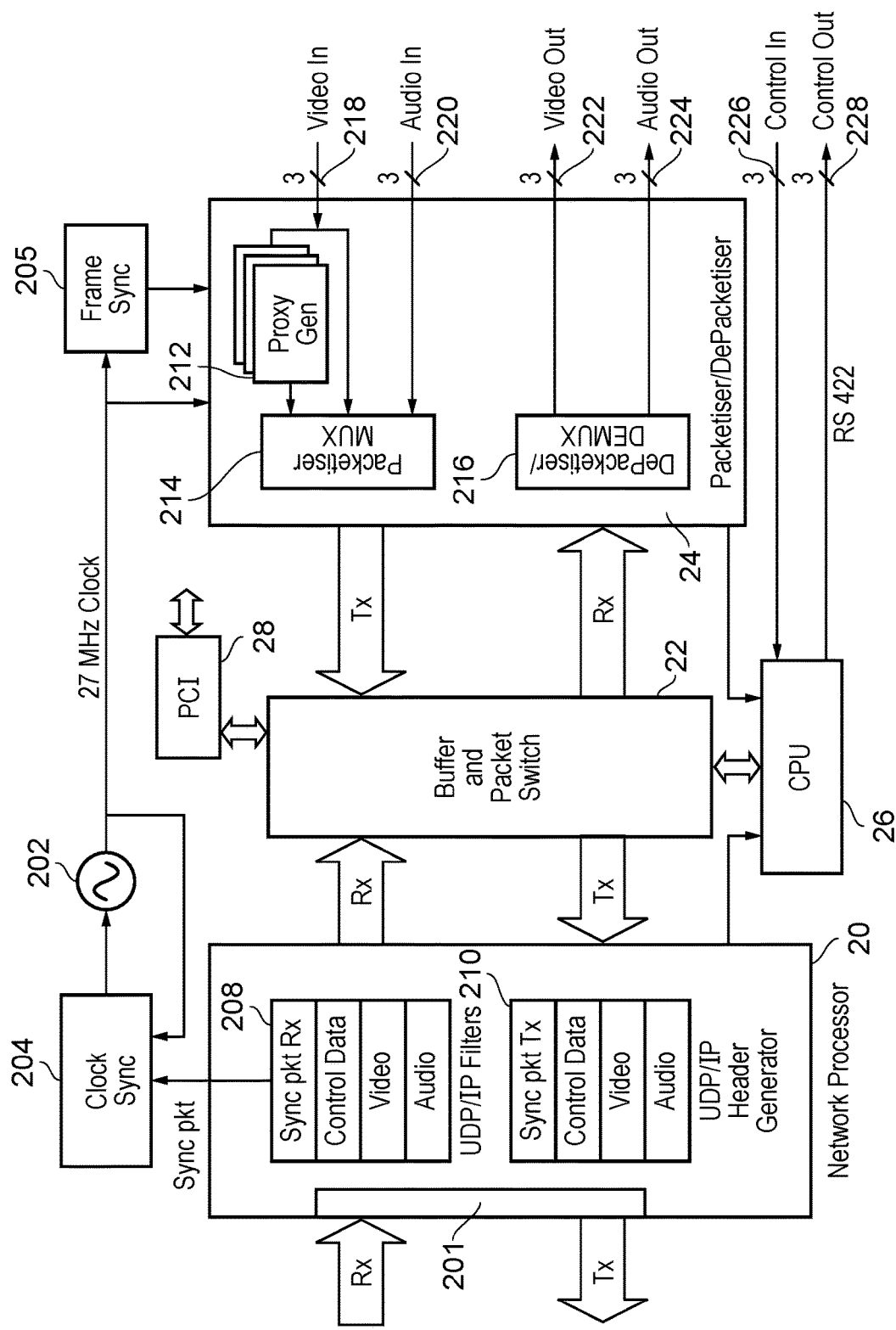
FIG. 4 is a schematic block diagram of a network interface of the network of FIG. 1.

Referring to FIG. 4, an ENIC comprises a network processor 20, a buffer and packet switch 22, a packetiser/depacketiser 24, a control processor CPU 26, a peripheral component interconnect PCI 28, a clock 202, a clock synchronisation circuit 204 and a frame synchronisation circuit 205. The clock synchronisation circuit 204 is described in GB-A-2 385 684. The frame synchronisation circuit is described in GB-A-2 400 255.

The packetiser/depacketiser has three video inputs 218 for receiving respective SDI video streams, three audio inputs 220 for receiving respective SDI audio streams.

Alternatively, three input ports could be provided for receiving combined SDI audio/video streams and the audio and video streams could be subsequently separated to form three audio and three video streams with in the ENIC. In further alternative embodiments AES digital audio streams could be supplied as input to the packetiser/depacketiser. The packetiser/depacketiser 24 has likewise three video outputs 222 and three audio outputs 224.

The CPU 26 has three control data inputs 226 and three control data outputs 228, here denoted "RS422" because they provide control similar to that provided by RS422 in a conventional studio. The three video inputs 218 are connected to respective ones of three substantially real-time proxy video generators 212 which generate the low resolution versions of the video streams as will be described below. The outputs of the proxy generators and the SDI video inputs 218 are supplied as input to a packetiser and multiplexer 214, which converts the full resolution serial video from the inputs 218 and the proxy video from the proxy generators 212 to packets suitable for transmission across the network. The packets are then supplied to the buffer and packet switch 22. The packetiser/depacketiser 24 has a depacketiser 216 and demultiplexer for receiving packets representing the SDI video and audio channels from the packet switch 22. It depacketises and demultiplexes the video and audio into 3 serial video streams and 3 serial audio streams for supply to respective ones of three video outputs 222 and three audio outputs 224. Thus the packetiser/depacketiser 24 provides routing of the video and audio received from the network in packetised form via the packet switch 22 to outputs 222 and 224 in serial digital format and further provides the routing of the serial digital video and audio data received from source devices via the inputs 218,220 to the buffer and switch 22 for transmission in packetised form across the network.

The packetiser/depacketiser 24 also provides synchronisation of the different video and audio streams in conjunction with the clock synchronisation circuit 204 and provides frame alignment of the video frames of the different video streams in conjunction with the frame synchronisation circuit 205.

The buffer and packet switch 22 provides routing of video, audio and control packets received from the network processor 20 in accordance with a series of tags, which are applied to the packets in the network processor 20. The network processor 20 generates the tags in accordance with header data in the received packets. There are two sorts of tag: a "flow" tag, which defines the route of the data through the packet switch 22, and a "type" tag, which defines the final output to which the packets are supplied by the packetiser/depacketiser 24.

The video and audio packets are routed to the depacketiser 216, whereas the control packets are routed to the CPU 26.

The network processor 20 comprises UDP/IP filters 208, which detect, using packet header information, sync, audio, video, status and control data packets received from the network. Received clock sync packets are directed by the network processor 20 directly to the clock synchronisation circuit 204 to synchronise the ENIC clock 202 with a master reference clock as described in GB-A-2 385 684. Frame sync packets are directed by the network processor 20 to the clock sync circuit 204 and then to the frame sync circuit 205 via the ENIC clock 202. The network processor 20 directs the sync packets directly to the clock synchronisation circuit 204 and to the frame synchronisation circuit 205 to reduce time delays which may otherwise reduce the accuracy of the synchronisation. Other packets, for example AVSCP packets, which are not recognised by the filters 208 are directed to the CPU 26 (although in alternative arrangements) filters could be set up for these.

The network processor 20 attaches tags to the audio and video packets in accordance with the header data received with them. The tagged video and audio packets are supplied to the packet switch 22, which routes them to the depacketiser 216 or to the PCI 28 computer interface. The tagged control data packets are directed by the buffer and packet switch 22 to the CPU 26. The buffer and packet switch 22 is described in more detail below.

Routing Data in an ENIC

1. Data received from the network

An ENIC may receive from the network: audio and video data packets as shown in FIG. 3A; AVSCP data packets as shown in FIG. 3B; stream status data packets (in essentially the same format as shown in FIG. 3A); and unicast control data packets as shown in FIG. 3C. The Ethernet header provides the physical address of the ENIC allowing a packet to be delivered by the network in known manner to the ENIC.

The network processor 20 of the ENIC (see FIG. 4) has the UDP/IP filters 208 that extract the IP and UDP headers, decode the address information in the headers and detect the payload data type from the payload type field (see FIG. 3A). The network processor 20 then replaces the packet header with a tag identifier, which specifies a data processing route through the ENIC for the packet payload data to a target data handling node such as a video or audio processor. FIG. 5A schematically illustrates the data format of a tagged packet.

The tagged data packet is 32 bits wide and is of indefinite length, which is to say that the payload has a variable length. The first 32 bits of the tagged packet comprise an 8-bit-"flow"data field, an 8-bit"type"data field and a 16-bit"size-"field. The next 32 bits are currently unused. The unused field is followed by a payload field. For audio and video data the tagged packet payload comprises the RTP header and the payload type data in addition to the audio or video data payload of FIG. 3A. In the case of both AVSCP/CNMCP data packets and unicast control data packets (see FIGS. 3B and 3C) the tagged packet payload is the message data.

First example of operation: Multicasting of Audio Data

In this example, it is desired to form a data communication path to transmit AES audio data from source group S9 across the network to the audio processors D3. The AES audio data is to be packetised by. ENIC NI6, sent across the network and received and depacketised by ENIC NI10 before being delivered in serial digital format to the audio processors D3. The user may instigate the connection between audio source S9 and the audio processors by interacting with the GUI described with reference to FIGS. 9 to 11 and displayed by the switching and routing client 6.

To set up the communication paths between audio source group S9 and audio processors D3, the switching and routing client 6 sends a CNMCP switch request message to a predetermined port of the network manager 4 to initiate a change to the current configuration of virtual circuit-switched connections. The network manager 4 sends CNMCP messages to the switching and routing client 6 providing information on the source devices and destination devices (and the associated source groups and destination end points) that are available to it. This enables the switching and routing client 6 to derive a view specifying the current configuration and status of the network. Each source device and destination device has an associated ID assigned by the network manager in communications to the switching and routing client 6 and this device ID is used by the switching and routing client 6 in subsequent communications with the network manager. In response to a user request to connect S9 to D3 the switching and routing client 6 send a CNMCP message device to the network manager 4 containing the ID of the relevant source device and the ID of the destination.

In the event that the switching and routing client 6 is not permitted to perform this operation (for example if there is insufficient network bandwidth available to form a reliable connection) then the network manager 4 sends a NACK (negative acknowledgement) CNMCP message to the switching and routing client 6 in response to the connection request.

On the other hand, if the network manager 4 permits establishment of the connection, the connection request will be processed as follows.

First, the network manager 4 queries its network configuration database to determine which multicast IP address the AES audio data from source group S9 is currently being transmitted to. Then an AVSCP switch message containing the multicast IP address to which S9 transmits is created by the network manager 4 and sent to the relevant port (device) of the ENIC NI10, which connects the audio processors D3 to the network. Embedded software on the ENIC NI10 sends an IGMP join message to the multicast IP address on which the audio data of S9 is transmitted and then sends an AVSCP ACK message back to the network manager. This enables the ENIC NI10 to receive the output of the audio source S9 on one of its destination devices and the ENIC NI9 will route the received audio data to the source device (ENIC AES output port) that connects to the audio processors D3.

Meanwhile, the network manager 4, having received the AVSCP ACK message from the ENIC NI10 acknowledging that the instruction to join the specified multicast IP address has been received, will update the routing information in the network configuration database to reflect the existence of the newly formed connection. Finally, the network manager 4 sends a CNMCP ACK message to the switching and routing client 6 indicating that the requested audio data connection between S9 and D3 has been successfully set up.

Second Example of Operation: Multicasting of AV Data

In this example of operation, two of the source groups of FIG. 1 are connected to a single destination end point. In particular, the outputs of 'Camera 1' S1 and 'Camera 2' S2 are supplied as inputs to the video switch D8. To initiate connections between S1 and D8 and between S2 and D8, the switching and routing client 6 sends CNMCP switch messages to the network manager 4 containing the ID values associated with 'Camera 1' S1, 'Camera 2' S2 and the video switch D8.

Recall that the network configuration database of the network manager 4 also stores data in relation to each ENIC device category. In particular, the network configuration database stores data indicating whether each source device is linked, the number of video lines to delay transmission of the data stream by and the current transmission status the source device. The network manager 4 also derives information with regard to the destination devices from the database, including the IP address of the ENIC that implements the device and the number of video lines to delay playout by.

From the network configuration database the network manager 4 can determine the multicast IP address that each of the camera source groups S1, S2 transmits data to. Thus to establish the connections between the two cameras S1, S2 and the video switch D8 the network manager 4 transmits AVSCP messages to the ENIC NI8 specifying both the multicast IP address onto which 'Camera 1' transmits AV data and the multicast IP address onto which 'Camera 2' transmits AV data. Each of the AVSCP message from the network manager 4 is detected by the network processor 20 (FIG. 4) of the ENIC NI8 and fed to the CPU 26 of the ENIC NI8 which issues an IGMP join message to the network. The AV packets output by each of the two cameras are received by the network processor 20 of the ENIC N18. Each of the received video packets specifies, in its header data, a destination IP address and the multicast group for which that AV packet is destined is derived from the IP address. The ENIC NI8 determines from the multicast group, to which output port (source device) of the ENIC Nib, the depacketised AV data should be routed. As explained above the multicast group determines to which subset of destination devices in the network a data packet should be routed. In the ENIC N18, the headers are removed from the AV packets by the network processor 20 and replaced by the tags (as described above with reference to FIG. 4). The packet switch 22 routes the video packets to the demultiplexer 2401 (see FIG. 6A) according to the flow data in the tag. The demultiplexer 2401 depacketises that data and routes it to RTP/FEC decoders 2402 and 2403 (by way of example) where decoding is performed and video frames are reconstructed. The output from the decoders 2402 and 2403 is subsequently supplied to frame stores 2405 and 2406 respectively. In addition, the frame sync circuit 205 of the ENIC NI8 (see FIG. 4) aligns the frames of the two video streams, taking into account the line delay information stored in the network configuration database by the network manager 4. The video switch D8 (FIG. 1) receives the two AV SDI streams from the ENIC N18.

In addition to setting up data communication channels between 'Camera 1', 'Camera 2' and the video switch D8, it is also appropriate to set up control channels, which are specified by data structures in the network configuration database. An AV stream control path. is set up sending two 'CREATE STREAM CTRL' AVSCP messages from the switching and control server 6 to the two ENICs defining the end points of the control path. Each 'CREATE STREAM CTRL' message sets up one end of the control path at an EN IC. Once the control path has been established, UCD data packets can be sent to the ENIC N18, for example, to instruct the video switch D8 to change its output from data sourced from 'Camera 1' to data sourced from 'Camera 2'.

Accordingly, in addition to the AV data streams from 'Camera 1' and 'Camera 2', the video switch D8 also receives control data from the CPU 26 (FIG. 4) of the ENIC N18. The control data is sent by the switching and routing client 6 (FIG. 1) as Unicast control data, which is received via the network in packetised form by the network processor 20 (FIG. 4) of ENIC N18. The Unicast control data has a header that identifies it as a control packet. and accordingly (as described above with reference to FIG. 4), these control packets are routed to the CPU 26 of the ENIC N18. The control data may instruct the video switcher D8 to switch its output from one of the AV streams to the other (for example from 'Camera 1' to 'Camera 2').

Figure 5:
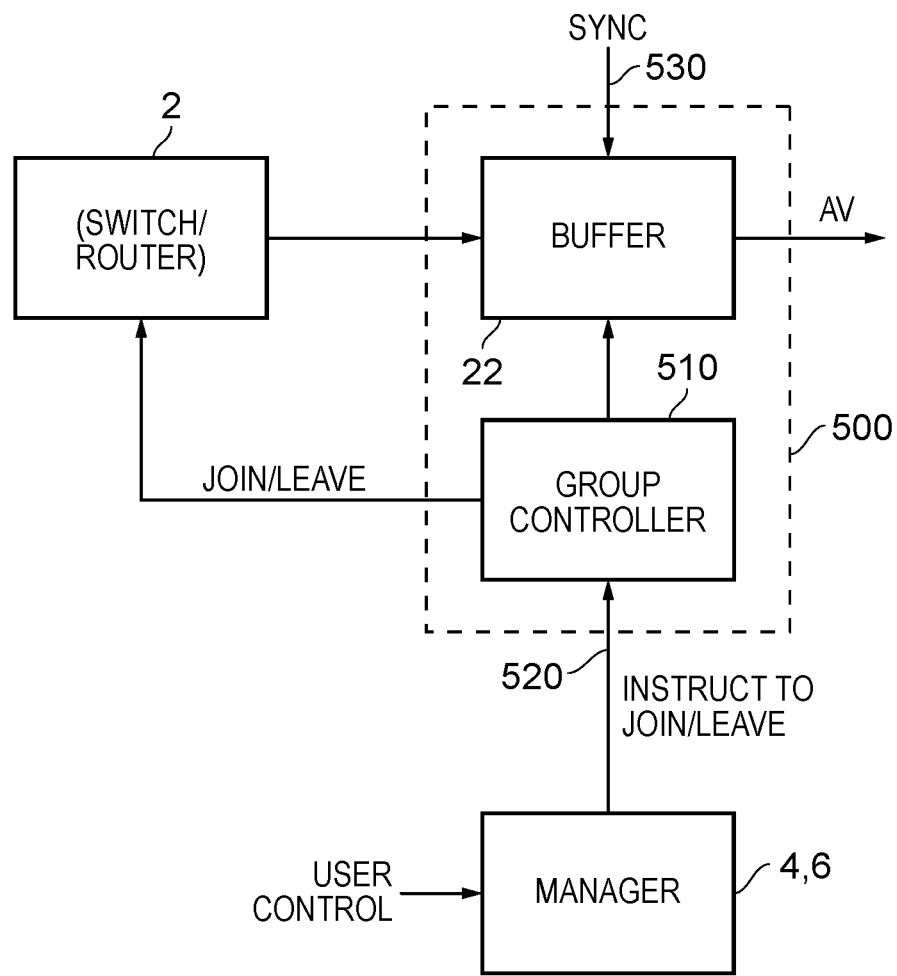
FIG. 5 schematically illustrates aspects of the operation of an ENIC.

As a summary of the description given above, FIG. 5 schematically illustrates an ENIC 500 corresponding to a destination, switching between one source and another source. Here, the switch 2 and the network manager and switching and routing client 4, 6 are shown, but other parts of the network of FIG. 1 not shown for clarity of this particular diagram. Similarly, in the case of the ENIC 500, only a subset of the technical features of the device are illustrated.

Within the ENIC 500, a group controller 510, which may be implemented by the CPU 26 of FIG. 4, handles the issuing of IGMP multicast group join instructions, which it sends to the switch 2 or to another route are associated with the network. The group controller 510 also contributes to the control of the buffer 22. The buffer 22 receives data from the network (via the network processor 20 of FIG. 4) and outputs AV data (via the depacketiser 24).

As discussed above, in response to, for example, a user control, the ENIC 500 is instructed to join a multicast group corresponding to a required source. In response to the instruction 520, the group controller 510 issues an IGMP group join message to the switch/router 2. In response to that join message, the switch/router 2 directs packets carrying that multicast group identifier to the ENIC 500, where they are buffered by the buffer 22 before the output as AV data. The output from the buffer can be in accordance with a synchronisation clock signal 530.

The description of the data routing to the video switch D8 concerned a destination device which could handle multiple video inputs simultaneously (and indeed, in that example of a video switch operating as a switch in the serial video domain, the device has to have two or more to switch between). Other destination devices handle only one input at a time. If such devise are connected directly to the network (rather than to the serial video output of a switch such as D8) then the switching from one source signal to another has to be carried out by the network and ENIC, which is to say that the switching is carried out in the packetized video domain.

Therefore, in order to change from one source to another source under such an arrangement, the ENIC 500 is instructed by an instruction 520 to join the multicast group corresponding to the new source and to leave the multicast group corresponding to the previous source. In response to the instruction 520, the ENIC 500 issues an IGMP join message in respect of the new group and an IGMP leave message in respect of the previous group. The description to be provided below concerns the relative timing of implementation of those "join" and "leave" messages.

A particular problem to be addressed concerns how to provide so-called clean switching of video data in the type of packet switched video network of FIG. 1.

Here, clean switching refers to a situation in which the destination ENIC 500 is switching its video input from one source device to another source device, and in particular the need for the destination device to have a complete video frame for each video frame period.

The problem with achieving clean switching can occur because the switching and routing of video packets in a network of this type is carried out by conventional packet routing devices such as the switch 2. Such devices do not have the capability to allow destination devices to join and leave multicast groups at particular, precise, times relative to the data content of the packets. In particular, current packet routing devices simply cannot provide for a destination device to (a) leave a multicast group for a first source device, and (b) join a multicast group for a second source device, at the exact boundary between video frames for each of the two source devices.

But if a destination device leaves one multicast group (for the first source device) and joins another multicast group (for the second source device) at an arbitrary point in time, the situation could arise that—for at least one frame period—the destination device receives a partial frame from the first source device and a partial frame from the second source device, which means that the destination device has no valid video data for that frame period.

Techniques to address this problem will be discussed below. First, however, aspects of the operation of the buffer 22 will be discussed with reference to FIGS. 6 and 7.

Figure 6:
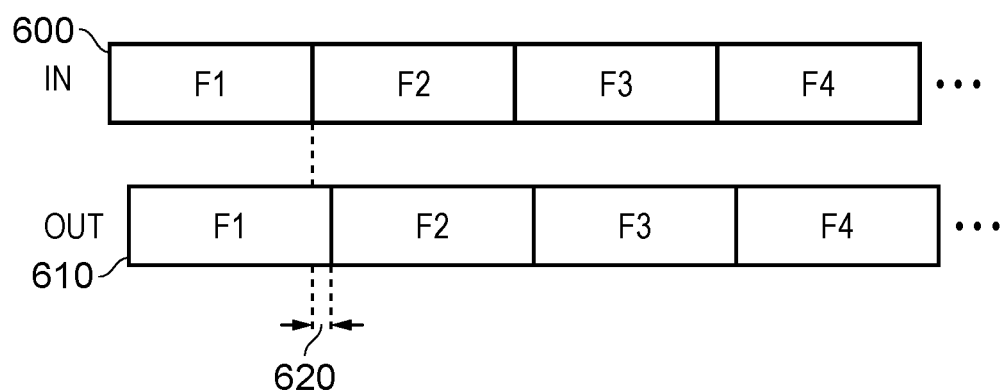
FIGS. 6 and 7 schematically illustrate buffering operations.
Figure 7:
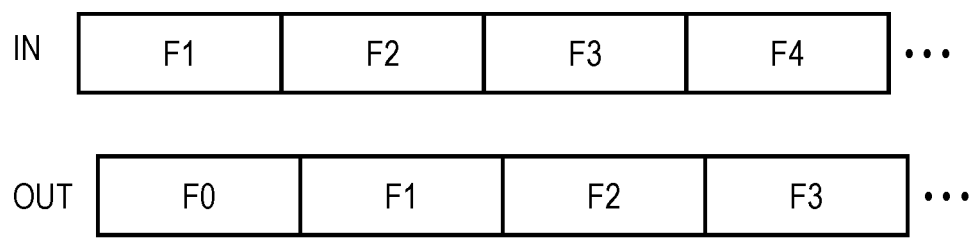

In particular, FIGS. 6 and 7 schematically illustrate the normal operation of the buffer 22, which is to say, not during a switching operation from one source to another source, according to two different modes of operation. In general terms, it is envisaged that an ENIC would operate according to one or the other of the modes of operation shown in FIGS. 6 and 7, but in other potential embodiments the mode of operation could be switchable, for example at initial power-on or boot of the ENIC.

In order to allow for the time-synchronisation of AV data which has propagated across the network of FIG. 1 by potentially different routes, or at least routes of different electrical lengths, the buffer 22 provides at least a short period of delay so that incoming AV data can be delayed by a variable amount so that its output from the buffer 22 is in synchronisation with the clock signal 530. The clock signal 530 can refer to a data rate clock but, with more significance to the present discussion, can also include a frame synchronisation clock so that each video frame is output from the ENIC according to the frame synchronisation clock. Note that, as discussed, FIG. 5 is a simplification of the arrangement of FIG. 4, and that frame synchronisation may take place as the data is output from the depacketiser 24, but for the purposes of this discussion this functionality is assumed to be part of the overall buffer arrangement.

So, to provide the frame synchronisation, the data needs to be received by the ENIC at least a short period before it is required to be output. This short period may be as little as the period corresponding to a few video lines, for example 1-10 video line periods (where a line period is taken to be substantially equal to a video frame period divided by the number of video lines transmitted in that video frame period).

Referring to FIG. 6, a succession 600 of input frames, F1, F2 . . . are received by the buffer arrangement 22, and a succession 610 of output frames (also F1, F2 . . . ) are output by the buffer arrangement 22. A synchronisation delay 620, as discussed above, is provided between the time at which the frames are input to the buffer (which time is dependent upon network transmission) and the time at which the frames are output (which time is dependent upon the required frame synchronisation).

In another possible arrangement, as illustrated schematically in FIG. 7, the buffer arrangement 22 stores a whole frame, so that (for example) data corresponding to the frame F1 does not even start to be output until the whole of the frame F1 has been received by the buffer.

Figure 8:
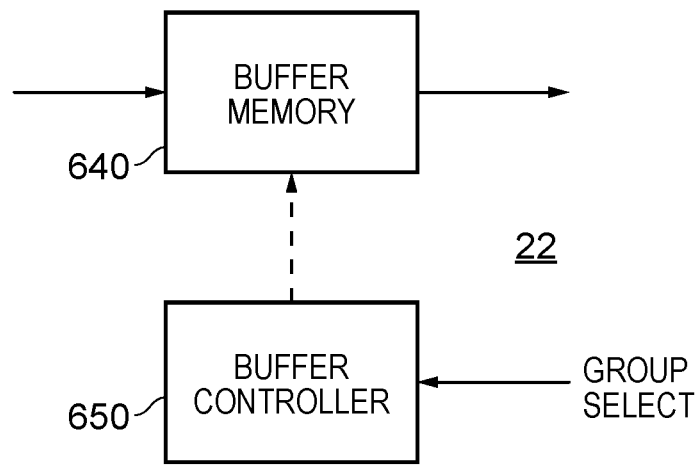
FIGS. 8 and 9 schematically illustrate buffer arrangements within an ENIC.
Figure 9:
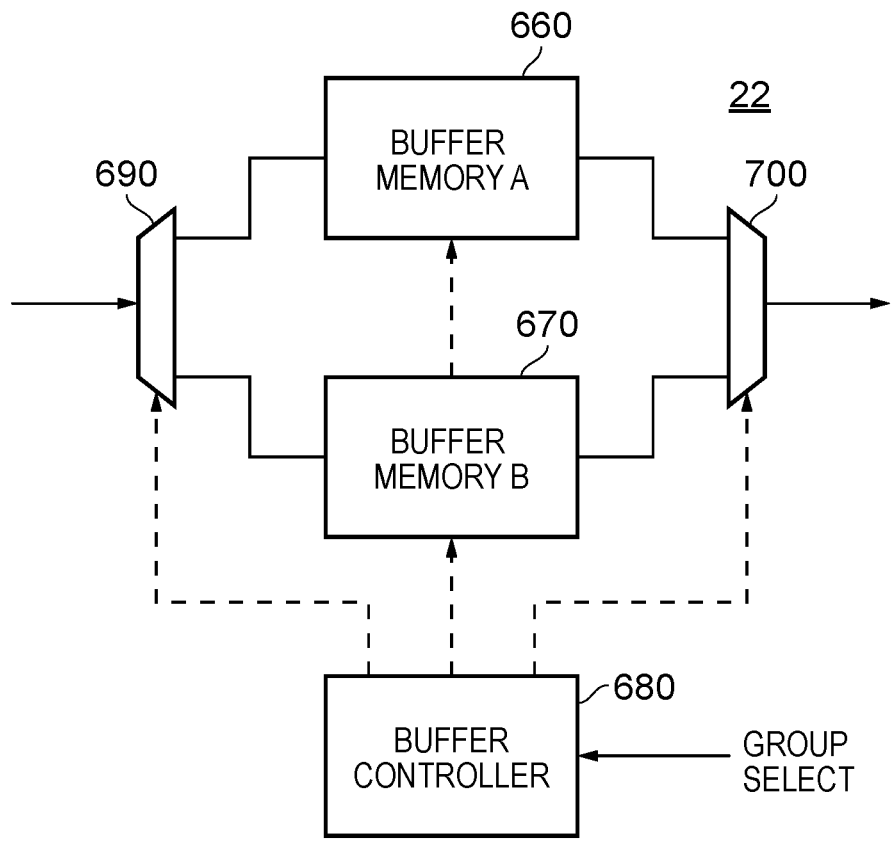

FIGS. 8 and 9 schematically illustrate optional arrangements for the buffer arrangement 22. The reason why these arrangements are relevant to the present discussion will be covered below with reference to FIGS. 10-13.

FIG. 8 schematically illustrates a buffer arrangement 22 in which a single buffer memory 640 is provided, under the control of a buffer controller 650. Here, the reference to a "single" buffer memory relates to the fact that the buffer memory 640 stores data from only one incoming data stream at a time. It does not refer to the physical or logical structure of the buffer memory 640 in any other respect. The buffer controller response to a group selection signal issued by the group controller 510 and indicative of the most recently joined multicast group, so that the buffer controller can detect, from a change in the group selection signal that a group switching operation has been executed. Further aspects of the operation of FIG. 8 will be discussed further below.

FIG. 8 therefore schematically illustrates an example of a video data destination comprising a video data buffer; and a buffer controller configured to direct video data received from a current video data source to one of the buffers and, in response to a switching operation, to designate the video data source for which the video destination has newly joined the multicast group as the current video data source.

As an alternative to the arrangement of FIG. 8, FIG. 9 schematically illustrate a different buffer arrangement within an ENIC in which a pair of buffer memories 660, 670 are provided, again under the control of a buffer controller 680. As before, the reference to a "pair" of memories indicates that the buffer is capable of receiving and storing data from two sources simultaneously (even if the subsequent processing or the connected device is not capable of handling two data sources simultaneously). The term does not reflect any other physical or logical structure of the memory. Input data is routed to one or the other of the buffer memories 660, 670 by a demultiplexer 690 (under the control of the buffer controller 680) and data from the buffer memories is routed to subsequent parts of the ENIC by a demultiplexer 700 controlled by the buffer controller 680. Note that in FIGS. 8 and 9, control signal paths are indicated by dashed lines.

The specific operation of FIG. 9 will be discussed below, but in general terms the buffer controller 680 co-operates with the demultiplexer 690 and the multiplexer 700 so that AV data from a particular source is routed to a particular one of the buffer memories. If the source is changed, by means of a join instruction, data from the newly joined multicast group is routed to the other of the buffer memories.

Accordingly, FIG. 9 schematically illustrates an example of a video data destination comprising first and second video data buffers (for example, 660/670); and a buffer controller (for example, 680) configured to direct video data received from a current video data source to one of the buffers and, in response to a switching operation, to direct video data received from a video data source for which the video destination has newly joined the multicast group, to the other of the video data buffers.

Figure 10:
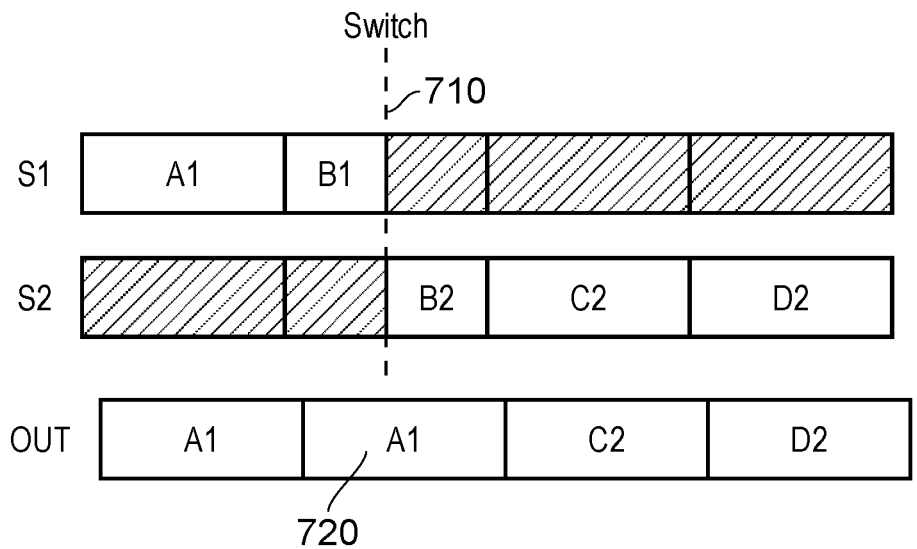
FIGS. 10-13 schematically illustrate variants of a buffering operation during a switch from one source to another source.
Figure 11:
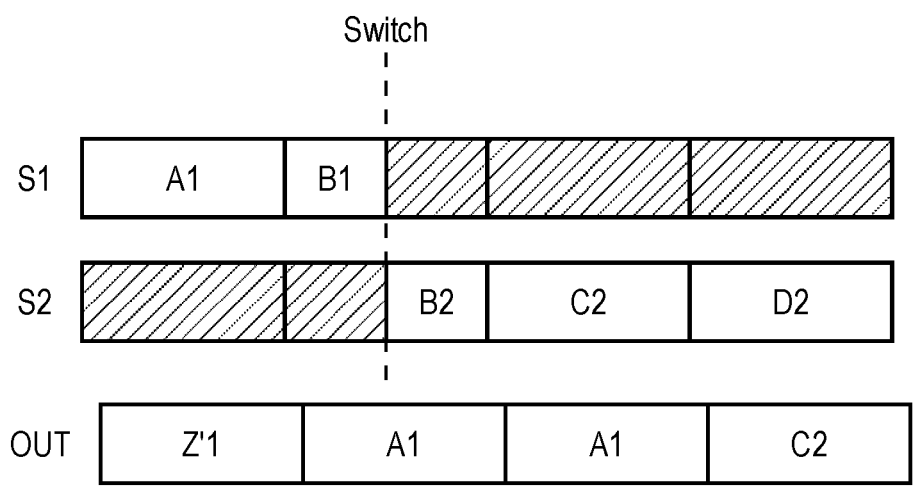

FIGS. 10 and 11 related to the operation of the single buffer system of FIG. 8. A similar notation is used to do that provided in FIGS. 6 and 7, except that two input sources, S1 and S2, are being considered. A switching operation, initiated at a switch time 710, causes the destination to switch from the source S1 to the source S2. A third row of the diagrams, labelled "out", indicates data output by the buffer under consideration. Video frames from the source S1 are labelled A1, B1, C1 . . . . Video frames from the source S2 are labelled A2, B2, C2 . . . . A time order runs from left to right in the diagrams.

Under the single buffer arrangement of FIG. 8, data from only one source can be received at any time. So, the multicast join and leave instructions are issued at the same time by the ENIC, and under the control of the buffer controller 650, the buffer memory 640 of FIG. 8 changes, at the time 710, from storing data relating to the multicast group for the source S1 to storing data for the multicast group for the source S2. So, in this regard, it does not matter whether the join and leave instructions are implemented simultaneously by the network; the buffer controller 650, responsive to the group selection signal, controls the buffer memory 640 to switch from buffering packets from S1 over to buffering packets from S2.

As discussed above, the switch happens at an arbitrary time so that (in the example shown) neither the frame B1 nor the frame B2 is properly buffered. Accordingly, neither of these frames can be output for further processing.

A solution provided by the embodiment of FIGS. 8 and 10 is that when data representing a partial video frame from the second (newly switched to) video data source, the video data destination (in this case, the buffer arrangement 22) is configured to output (or, more generally, process) video data corresponding to a video frame which, at the end of that frame period, represents a most recently received video frame from the first (switched-from) video data source. In particular, the video data output in respect of the frame period 720 in which the switch takes place is the data for the most recently received complete frame from S1, that is, the frame A1. In other words, the switching operation prompts the re-use of previous video material from the buffer.

FIG. 11 shows a similar arrangement, again relating to the single buffer memory embodiment of FIG. 8, but applying the delayed output as discussed with relation to FIG. 7. So, each frame is delayed by just over a frame period before being output. In this case, the output sequence as shown in FIG. 11 is Z'1 (a notation used for the frame preceding A1 in the stream from the source S1), A2, A2, C2 . . . . Accordingly, at the time of switching, a partial frame is received from the switched-to source S2, and so the most recently received complete frame from S1 is output again.

Both of these arrangements provide a clean switch with no break in video output even though the switching operation is carried out by multicast group join and leave operations at an arbitrary point in time, and only a single video buffer is provided.

Figure 12:
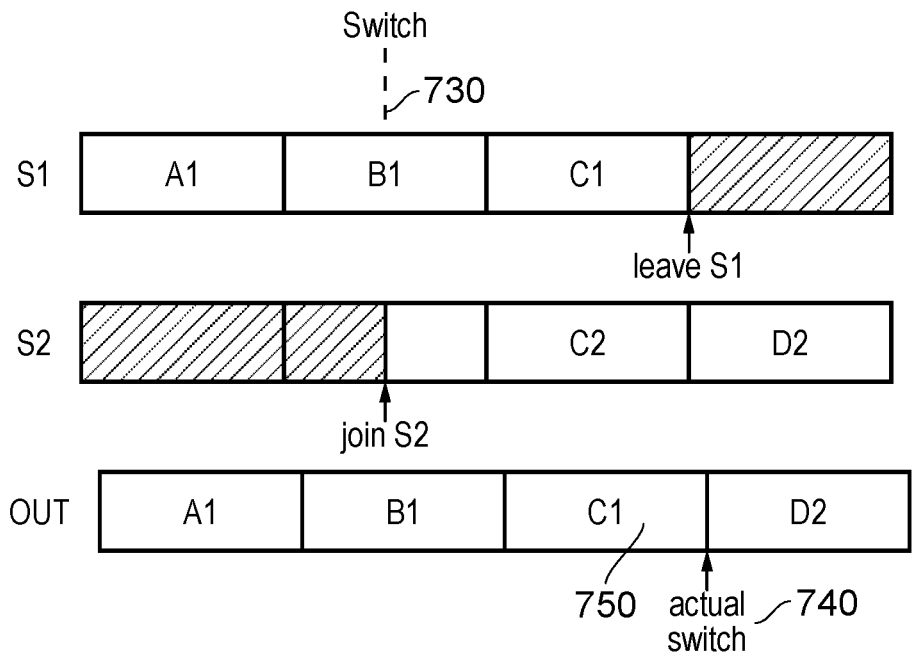
Figure 13:
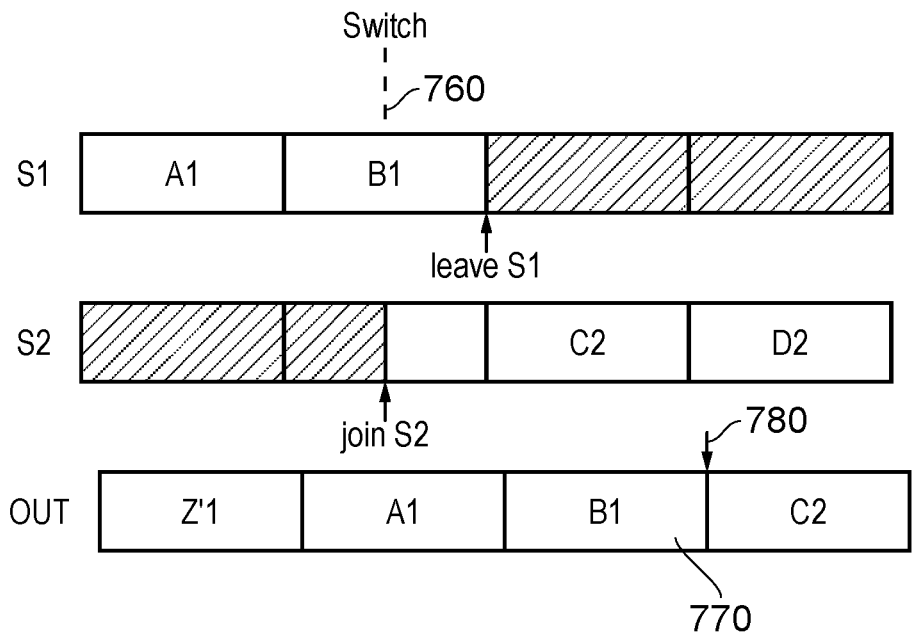

Turning now to FIGS. 12 and 13, these relate to the dual buffer arrangement of FIG. 9. Other aspects of the notation used are the same as those already discussed.

FIG. 12 corresponds to the delay arrangement of FIG. 6, in that a video frame is output by the buffer arrangement only a very short period after it has been received. FIG. 13 corresponds to the frame delay buffer arrangement discussed with reference to FIG. 7.

In FIG. 12, a switching time 730 is defined, which represents the time at which the ENIC joins the multicast group corresponding to the source S2. However, at that time, the ENIC does not leave the multicast group corresponding to the source S1. Accordingly, until a complete frame has been received from the source S2, the buffer 22 in the arrangement of FIG. 12 can continue to output frames from the source S1, namely frames A1, B1, C1. Once a complete frame has been received from the source S2, the ENIC can leave the source S1. The leave operation is shown at a frame boundary in FIG. 12 but can instead be at any arbitrary point once a complete frame has been received from the source S2. Accordingly, the actual switch in this arrangement takes place at a switching time 740. The switch is clean in that there are no gaps in the video output, and, unlike the arrangement of FIGS. 10 and 11, there is no need to repeat any video data.

Note that the third output frame 750 is shown as C1 in FIG. 12. In another embodiment, C2 could be used for this output frame, so that the ENIC is able to leave the multicast group corresponding to the source S1 at any time after the end of the frame period corresponding to the reception of the frame B1, which is to say that the ENIC can leave the multicast group for S1 once it is in a position to receive a complete frame from S2. This would give a succession of output frames as A1, B1, C2, D2 . . . and an actual switch time corresponding to the beginning of the frame period 750.

FIG. 13 shows a similar arrangement, but this time using the frame-delayed output discussed with reference to FIG. 7. Again, the frame Z'1 simply represents that frame which preceded the frame A1 from the source S1.

At a switching time 760 the ENIC joins the group corresponding to the source S2 but does not leave the group corresponding to the source S1. This means that in respect of a frame period 770, which is the output frame period corresponding to the switching time 760, a frame from the source S1 (the frame B1) is output. For the subsequent frame period, a complete frame has been received from the source S2 and so that frame (C2) is output. The ENIC can leave the source S1 at any time after the frame B1 has been received. The effective switching time or actual switch is shown as a time 780.

Accordingly, each of the above arrangements provides an example of a technique in which in respect of a frame period during which the video data destination circuitry joins a multicast group corresponding to the second video data source and so receives data representing a partial video frame from the second video data source, the video data destination circuitry is configured to process video data corresponding to a video frame which, at the end of that frame period, represents a recently received video frame from the first video data source.

At least some of the above arrangements provide an example of a video data destination circuitry which is configured to process video data corresponding to a video frame which, at the end of that frame period, represents a most recently received video frame from the first video data source.

The operations described with respect to FIGS. 10 and 11 provide an example of an arrangement by which a video data destination circuitry is configured, in respect of a switching operation from the first video data source to the second video data source, to leave the multicast group corresponding to the first video data source and to join the multicast group corresponding to the second video data source at substantially the same time; and to reuse a most recently received video frame from the first video data source until the video data destination has received at least one whole frame of video data from the second video data source.

The operations described with respect to FIGS. 12 and 13 provide an example of an arrangement by which a video data destination circuitry is configured, in respect of a switching operation from the first video data source to the second video data source, not to leave the multicast group corresponding to the first video data source until the video data destination has received (or at least is in a position to receive) at least one whole frame of video data from the second video data source. The use of the switching points 740, 780 provides an example of the video data destination circuitry being configured to leave the multicast group corresponding to the first video data source in response to the video data destination having received one whole frame of video data from the second video data source.

Note that references to a circuitry (such as a video data destination circuitry) may be taken to represent corresponding references to the respective item (such as a video data destination) and vice versa.

Although discussions have been provided relating to an overall network, embodiments are also applicable to a video destination device for use in a packet-based video network comprising two or more video data sources, each configured to launch video data packets onto the network as multicast data packets each associated with a multicast group identifier corresponding to that video data source; in which: the video data destination device is configured to receive and process video data from a video data source by joining a multicast group corresponding to that video data source, and to execute a switching operation to switch from receiving video data from a first video data source to receiving video data from a second video data source by leaving a multicast group corresponding to the first video data source and joining a multicast group corresponding to the second video data source; and in respect of a frame period during which the video data destination device joins a multicast group corresponding to the second video data source and so receives data representing a partial video frame from the second video data source, the video data destination device is configured to process video data corresponding to a video frame which, at the end of that frame period, represents a recently received video frame from the first video data source.

Corresponding methods of operation of a network and/or of a video data destination device are also considered as embodiments of the present technology. Example implementations of such methods will be discussed below with reference to FIGS. 14 and 15.

Figure 14:
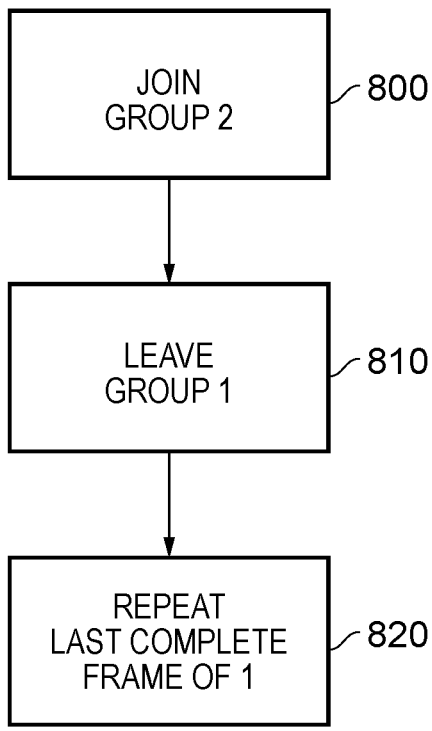
FIGS. 14 and 15 are schematic flow charts illustrating variants of the operation of an ENIC within the network of FIG. 1.
Figure 15:
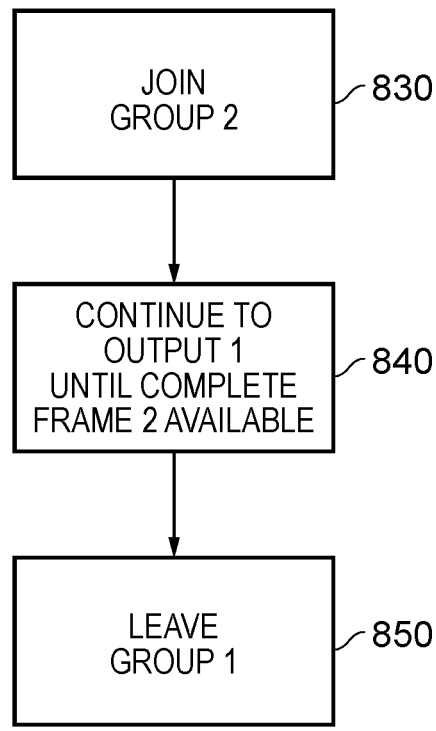

FIGS. 14 and 15 are schematic flow charts illustrating variants of the operation of an ENIC according to the systems discussed above. In particular, FIG. 14 relates to the operation discussed with reference to FIGS. 10 and 11. FIG. 15 relates to the operations discussed with reference to FIGS. 12 and 13.

In FIG. 14, the ENIC joins a new multicast group corresponding to a new source to be joined (group 2 in the notation of FIG. 14) and a step 800. As a step 810, the ENIC leaves the previous group (group 1 in the notation of FIG. 14). In respect of the switching period, being a frame period during which the ENIC receives only a partial frame from the newly joined group 2, the buffer arrangement of the ENIC repeats the last complete frame received from the original group 1, ata step 820.

Similar notation is used in FIG. 15. At a step 830, the ENIC joins group 2. At a step 840, the buffer arrangement of the ENIC continues to output frames from group 1 until a complete frame from group 2 is available. Here, the term "available" could mean that the frame from group 2 has already been received, or could mean that the system is at the start of a frame period for group 2 so that the system is now capable of receiving a complete frame from group 2. Once this stage has been reached, the ENIC is able to leave group one at a step 850.

Figure 16:
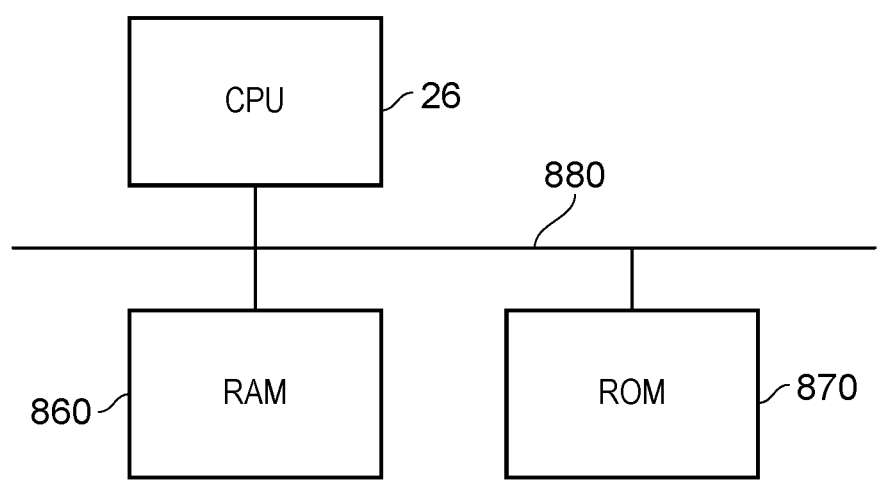
FIG. 16 schematically illustrates a software-controlled embodiment of an ENIC.

FIG. 16 schematically illustrates a software-controlled embodiment, in which a CPU (such as the CPU 26) is connected to random access memory 860 and read only memory 870 via a bus 880. Other components may be provided. The CPU 26 executes program instructions, which may be stored in the read only memory 870, for example (as an example of a non-transitory machine-readable storage medium; other examples include optical or magnetic disks) to carry out the method of FIG. 14 or FIG. 15 as appropriate. It will be appreciated that the software by which such operations are carried out, and a storage medium by which such software is provided, are considered as embodiments of the present disclosure.

Obviously, numerous modifications and variations of the present disclosure are possible in light of the above teachings. It is therefore to be understood that within the scope of the appended claims, the present disclosure may be practised otherwise than as specifically described herein.

References to a video data source and/or to a video data destination in the above description should be taken (where the context allows) to refer to video data source circuitry and/or video data destination circuitry, respectively.

At least some embodiments are defined by the following numbered clauses:

1. A packet-based video network comprising:
   two or more video data sources, each configured to launch video data packets onto the network as multicast data packets each associated with a multicast group identifier corresponding to that video data source; and
   a video data destination configured to receive and process video data from a video data source by joining a multicast group corresponding to that video data source, and to execute a switching operation to switch from receiving video data from a first video data source to receiving video data from a second video data source by leaving a multicast group corresponding to the first video data source and joining a multicast group corresponding to the second video data source;
   in which:
   in respect of a frame period during which the video data destination joins a multicast group corresponding to the second video data source and so receives data representing a partial video frame from the second video data source, the video data destination is configured to process video data corresponding to a video frame which, at the end of that frame period, represents a recently received video frame from the first video data source.

2. A network according to clause 1, in which the video data destination is configured to process video data corresponding to a video frame which, at the end of that frame period, represents a most recently received video frame from the first video data source 3. A network according to clause 1 or clause 2, in which the video data destination is configured, in respect of a switching operation from the first video data source to the second video data source, not to leave the multicast group corresponding to the first video data source until the video data destination has received at least one whole frame of video data from the second video data source.

4. A network according to clause 3, in which the video data destination is configured to leave the multicast group corresponding to the first video data source in response to the video data destination having received one whole frame of video data from the second video data source.

5. A network according to clause 3 or clause 4, in which the video data destination comprises:
   first and second video data buffers; and
   a buffer controller configured to direct video data received from a current video data source to one of the buffers and, in response to a switching operation, to direct video data received from a video data source for which the video destination has newly joined the multicast group, to the other of the video data buffers.

6. A network according to clause 1 or clause 2, in which the video data destination is configured, in respect of a switching operation from the first video data source to the second video data source,
   to leave the multicast group corresponding to the first video data source and to join the multicast group corresponding to the second video data source at substantially the same time; and
   to reuse a most recently received video frame from the first video data source until the video data destination has received at least one whole frame of video data from the second video data source.

7. A network according to clause 6, in which the video data destination comprises:
   a video data buffer; and
   a buffer controller configured to direct video data received from a current video data source to one of the buffers and, in response to a switching operation, to designate the video data source for which the video destination has newly joined the multicast group as the current video data source.

8. A video destination device for use in a packet-based video network comprising two or more video data sources, each configured to launch video data packets onto the network as multicast data packets each associated with a multicast group identifier corresponding to that video data source;
   in which:
   the video data destination device is configured to receive and process video data from a video data source by joining a multicast group corresponding to that video data source, and to execute a switching operation to switch from receiving video data from a first video data source to receiving video data from a second video data source by leaving a multicast group corresponding to the first video data source and joining a multicast group corresponding to the second video data source; and
   in respect of a frame period during which the video data destination device joins a multicast group corresponding to the second video data source and so receives data representing a partial video frame from the second video data source, the video data destination device is configured to process video data corresponding to a video frame which, at the end of that frame period, represents a recently received video frame from the first video data source.

9. A method of operation of a packet-based video network having two or more video data sources, each configured to launch video data packets onto the network as multicast data packets each associated with a multicast group identifier corresponding to that video data source and a video data destination configured to receive and process video data from a video data source by joining a multicast group corresponding to that video data source, and to execute a switching operation to switch from receiving video data from a first video data source to receiving video data from a second video data source by leaving a multicast group corresponding to the first video data source and joining a multicast group corresponding to the second video data source;
the method comprising:
in respect of a frame period during which the video data destination joins a multicast group corresponding to the second video data source and so receives data representing a partial video frame from the second video data source, the video data destination processing video data corresponding to a video frame which, at the end of that frame period, represents a recently received video frame from the first video data source.

10. A method of operation of a video destination device for use in a packet-based video network comprising two or more video data sources, each configured to launch video data packets onto the network as multicast data packets each associated with a multicast group identifier corresponding to that video data source;
the method comprising:
receiving and processing video data from a video data source by joining a multicast group corresponding to that video data source, and to execute a switching operation to switch from receiving video data from a first video data source to receiving video data from a second video data source by leaving a multicast group corresponding to the first video data source and joining a multicast group corresponding to the second video data source; and
in respect of a frame period during which the video data destination device joins a multicast group corresponding to the second video data source and so receives data representing a partial video frame from the second video data source, processing video data corresponding to a video frame which, at the end of that frame period, represents a most recently received video frame from the first video data source.

11. Computer software which, when executed by a computer, causes the computer to carry out the method of clause 9 or clause 10.

12. A machine-readable non-transitory storage medium which stores computer software according to clause 11.

The invention claimed is:

1. A network comprising:
a plurality of video data sources, each configured to launch video data packets onto the network as multicast data packets each associated with a multicast group identifier corresponding to a respective one of the plurality of video data sources; and
a video data destination device including:
processing circuitry configured to:
receive and process video data from one of the plurality of video data sources by joining a multicast group corresponding to the respective one of the plurality of video data sources, and
execute a switching operation to switch from receiving video data from a first video data source to receiving video data from a second video data source by (i) receiving at least one whole frame of video data from the second video data source, (ii) leaving a first multicast group corresponding to the first video data source only after receiving the at least one whole frame of video data from the second video data source, and (iii) joining a second multicast group corresponding to the second video data source;
a first video data buffer;
a second video data buffer;
a buffer controller configured to:
direct the video data received from the first video data source to the first video data buffer, and
in response to the switching operation, direct the video data received from the second video data source to the second video data buffer,
wherein the processing circuitry is further configured to:
join the second multicast group corresponding to the second video data source during a frame period,
receive data representing a partial video frame from the second video data source, and
process video data corresponding to a video frame which, at the end of the frame period, represents a recently received video frame from the first video data source.

2. The network according to claim 1, wherein the processing circuitry is further configured to:
leave the first multicast group corresponding to the first video data source and join the second multicast group corresponding to the second video data source at substantially the same time; and
reuse a most recently received video frame from the first video data source until the video data destination device has received the at least one whole frame of video data from the second video data source.

3. The network according to claim 2, wherein the buffer controller is further configured to, in response to the switching operation, designate the second video data source as a current video data source.

4. The network according to claim 1, wherein the processing circuitry is further configured to process video data corresponding to a video frame which, at the end of the frame period, represents a most recently received video frame from the first video data source.

5. The network according to claim 1, wherein the processing circuitry is further configured to leave the first multicast group corresponding to the first video data source in response to receiving the at least one whole frame of video data from the second video data source.

6. A video data destination device for use in a packet-based video network that includes a plurality of video data sources, each configured to launch video data packets onto the network as multicast data packets each associated with a multicast group identifier corresponding to a respective one of the plurality of video data sources, the video data destination device comprising:
processing circuitry configured to:
receive and process video data from one of the plurality of video data sources by joining a multicast group corresponding to the respective one of the plurality of video data sources, and
execute a switching operation to switch from receiving video data from a first video data source to receiving video data from a second video data source by (i) receiving at least one whole frame of video data from the second video data source, (ii) leaving a first multicast group corresponding to the first video data source only after receiving the at least one whole frame of video data from the second video data source, and (iii) joining a second multicast group corresponding to the second video data source;

a first video data buffer;

a second video data buffer;

a buffer controller configured to:
  direct the video data received from the first video data source to the first video data buffer, and
  in response to the switching operation, direct the video data received from the second video data source to the second video data buffer, wherein the processing circuitry is further configured to:
  join the second multicast group corresponding to the second video data source during a frame period,
  receive data representing a partial video frame from the second video data source, and
  process video data corresponding to a video frame which, at the end of the frame period, represents a recently received video frame from the first video data source.

7. The video data destination device according to claim 6, wherein the processing circuitry is further configured to:
  leave the first multicast group corresponding to the first video data source and join the second multicast group corresponding to the second video data source at substantially the same time; and
  reuse a most recently received video frame from the first video data source until the video data destination device has received the at least one whole frame of video data from the second video data source.

8. The video data destination device according to claim 7, wherein the buffer controller is further configured to, in response to the switching operation, designate the second video data source as a current video data source.

9. The video data destination device according to claim 6, wherein the processing circuitry is further configured to process video data corresponding to a video frame which, at the end of the frame period, represents a most recently received video frame from the first video data source.

10. The video data destination device according to claim 6, wherein the processing circuitry is further configured to leave the first multicast group corresponding to the first video data source in response to receiving the at least one whole frame of video data from the second video data source.

11. A method of operation of a packet-based video network having a plurality of video data sources, each configured to launch video data packets onto the network as multicast data packets each associated with a multicast group identifier corresponding to a respective one of the video data sources, the method comprising:
  receiving and processing, via a video data destination device, video data from one of the plurality of video data sources by joining a multicast group corresponding to the respective one of the plurality of video data sources;
  executing, via the video data destination device, a switching operation to switch from receiving video data from a first video data source to receiving video data from a second video data source by (i) receiving at least one whole frame of video data from the second video data source, (ii) leaving a first multicast group corresponding to the first video data source only after receiving the at least one whole frame of video data from the second video data source, and (iii) joining a second multicast group corresponding to the second video data source;
  directing, via a buffer controller, the video data received from the first video data source to a first video data buffer;
  in response to the switching operation, directing, via the buffer controller, the video data received from the second video data source to a second video data buffer;
  joining the second multicast group corresponding to the second video data source during a frame period;
  receiving data representing a partial video frame from the second video data source; and
  processing video data corresponding to a video frame which, at the end of the frame period, represents a recently received video frame from the first video data source.

12. The method according to claim 11, further comprising:
  leaving the first multicast group corresponding to the first video data source and join the second multicast group corresponding to the second video data source at substantially the same time; and
  reusing a most recently received video frame from the first video data source until the video data destination device has received the at least one whole frame of video data from the second video data source.

13. The method according to claim 12, further comprising:
  in response to the switching operation, designating, via the buffer controller, the second video data source as a current video data source.

14. The method according to claim 11, further comprising:
  processing video data corresponding to a video frame which, at the end of the frame period, represents a most recently received video frame from the first video data source.

15. The method according to claim 11, further comprising:
  leaving the first multicast group corresponding to the first video data source in response to receiving the at least one whole frame of video data from the second video data source.

16. A non-transitory computer-readable storage medium storing instructions that, when executed by one or more processors of a computing device, cause the computing device to carry out the method of claim 11.

* * * * *